(12) United States Patent
Lee et al.

(10) Patent No.: US 11,552,358 B2
(45) Date of Patent: Jan. 10, 2023

(54) TOP INSULATOR FOR SECONDARY BATTERY AND METHOD FOR MANUFACTURING THE SAME

(71) Applicant: LG CHEM, LTD., Seoul (KR)

(72) Inventors: Byoung Gu Lee, Daejeon (KR); Do Gyun Kim, Daejeon (KR); Sang Suk Jung, Daejeon (KR); Hang Soo Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 66 days.

(21) Appl. No.: 16/632,694

(22) PCT Filed: Jan. 3, 2019

(86) PCT No.: PCT/KR2019/000113
§ 371 (c)(1),
(2) Date: Jan. 21, 2020

(87) PCT Pub. No.: WO2019/146927
PCT Pub. Date: Aug. 1, 2019

(65) Prior Publication Data
US 2020/0144563 A1 May 7, 2020

(30) Foreign Application Priority Data

Jan. 29, 2018 (KR) .................. 10-2018-0010900
Oct. 19, 2018 (KR) .................. 10-2018-0125530

(51) Int. Cl.
*H01M 50/155* (2021.01)
*H01M 10/04* (2006.01)
(Continued)

(52) U.S. Cl.
CPC ..... *H01M 50/155* (2021.01); *H01M 10/0422* (2013.01); *H01M 10/0525* (2013.01);
(Continued)

(58) Field of Classification Search
CPC ............ H01M 50/155; H01M 50/116; H01M 50/124; H01M 50/147; H01M 50/152;
(Continued)

(56) References Cited

U.S. PATENT DOCUMENTS 5,274,196 A   12/1993  Weinberg
6,153,337 A * 11/2000  Carlson ............... H01M 10/052
                                              429/251
(Continued)

FOREIGN PATENT DOCUMENTS

CN     1560158 A    1/2005
CN     1747219 A    3/2006
(Continued)

OTHER PUBLICATIONS

Korean Office Action dated Sep. 8, 2020, issued in corresponding Korean Patent Application No. 10-2018-0125530.
(Continued)

*Primary Examiner* — Matthew T Martin
*Assistant Examiner* — Bartholomew A Hornsby
(74) *Attorney, Agent, or Firm* — Morgan, Lewis & Bockius LLP

(57) ABSTRACT

To solve the above problem, a method for manufacturing a top insulator configured to be inserted into a case of a secondary battery, according to an embodiment of the present invention includes: preparing a top insulator fabric by applying a silicone rubber to at least one surface of a glass fiber fabric formed by crossing weft yarns and warp yarns of glass fiber raw yarns; and punching the top insulator fabric.

9 Claims, 23 Drawing Sheets

(51) Int. Cl.
  *H01M 10/0525* (2010.01)
  *H01M 50/116* (2021.01)
  *H01M 50/124* (2021.01)
  *H01M 50/147* (2021.01)
  *H01M 50/152* (2021.01)
  *H01M 50/593* (2021.01)
  *H01M 50/586* (2021.01)
  *H01M 50/191* (2021.01)
  *H01M 50/186* (2021.01)

(52) U.S. Cl.
  CPC ....... *H01M 50/116* (2021.01); *H01M 50/124* (2021.01); *H01M 50/147* (2021.01); *H01M 50/152* (2021.01); *H01M 50/593* (2021.01); *H01M 50/186* (2021.01); *H01M 50/191* (2021.01); *H01M 50/586* (2021.01)

(58) Field of Classification Search
  CPC ......... H01M 10/0422; H01M 10/0525; H01M 50/183; H01M 50/186; H01M 10/058; Y02P 70/50
  See application file for complete search history.

(56) References Cited

U.S. PATENT DOCUMENTS

| | | | |
|---|---|---|---|
| 6,528,205 | B1 | 3/2003 | Kishimoto et al. |
| 7,666,546 | B2 | 2/2010 | Hong et al. |
| 9,299,967 | B2 | 3/2016 | Kim et al. |
| 2006/0057456 | A1 | 3/2006 | Hong et al. |
| 2009/0136848 | A1 | 5/2009 | Minami et al. |
| 2010/0055555 | A1 | 3/2010 | Fukase et al. |
| 2010/0159334 | A1 | 6/2010 | Kashima et al. |
| 2014/0186670 | A1* | 7/2014 | Kim .................. H01M 50/463 429/82 |
| 2014/0220394 | A1* | 8/2014 | Kim .................. H01M 50/60 429/54 |
| 2017/0317326 | A1* | 11/2017 | Fujikawa ............ H01M 50/578 |
| 2020/0185666 | A1 | 6/2020 | Lee et al. |

FOREIGN PATENT DOCUMENTS

| | | | | |
|---|---|---|---|---|
| CN | 103620849 | A | | 3/2014 |
| CN | 103782436 | A | | 5/2014 |
| CN | 204749409 | U | * | 11/2015 |
| CN | 204749409 | U | | 11/2015 |
| CN | 106283675 | A | | 1/2017 |
| CN | 107112472 | A | | 8/2017 |
| CN | 107627682 | A | | 1/2018 |
| CN | 209447923 | U | | 9/2019 |
| JP | S56-161140 | A | | 12/1981 |
| JP | S58-218710 | A | | 12/1983 |
| JP | H01-172280 | A | | 7/1989 |
| JP | H6-187863 | A | | 7/1994 |
| JP | H11-354092 | A | | 12/1999 |
| JP | 2001-283664 | A | | 10/2001 |
| JP | 2002-184391 | A | | 6/2002 |
| JP | 2002-231314 | A | | 8/2002 |
| JP | 2010-061815 | A | | 3/2010 |
| JP | 2011-007256 | A | | 1/2011 |
| JP | 2012-138308 | A | | 7/2012 |
| JP | 2014-053299 | A | | 3/2014 |
| JP | 2014192027 | A | | 10/2014 |
| JP | 2015016397 | A | | 1/2015 |
| JP | 2017-170769 | A | | 9/2017 |
| JP | 2017170769 | A | * | 9/2017 |
| JP | 2020-524372 | A | | 8/2020 |
| JP | 2020-524374 | A | | 8/2020 |
| KR | 10-2010-0007974 | A | | 1/2010 |
| KR | 10-2017-0072525 | A | | 6/2017 |
| KR | 20170072525 | A | * | 6/2017 ........ H01M 10/0422 |
| KR | 20170072525 | A | * | 6/2017 |
| WO | 2016/067510 | A1 | | 5/2016 |
| WO | WO-2016103667 | A1 | * | 6/2016 ........ H01M 10/0587 |

OTHER PUBLICATIONS

Extended European Search Report dated Oct. 26, 2020, issued in corresponding European Patent Application No. 19743388.1.
International Search Report dated Apr. 10, 2019 issued in corresponding International Patent Application No. PCT/KR2019/000113.
Japanese Office Action dated Dec. 22, 2020, issued in corresponding Japanese Patent Application No. 2019-569909.
Japanese Office Action dated Dec. 22, 2020, issued in corresponding Japanese Patent Application No. 2019-569935.
Chinese Office Action dated Feb. 6, 2020, issued in corresponding Chinese Patent Application No. 201910080012.2.
Chinese Office Action dated Dec. 1, 2021, issued in corresponding Chinese Patent Application No. 201980003502.0.
Office Action dated Jun. 15, 2022, issued in corresponding Chinese Patent Application No. 201980003502.0.

* cited by examiner

TOP INSULATOR FOR SECONDARY BATTERY AND METHOD FOR MANUFACTURING THE SAME

CROSS-REFERENCE TO RELATED APPLICATION

The present application claims the benefit of the priority of Korean Patent Application Nos. 10-2018-0010900, filed on Jan. 29, 2018, and 10-2018-0125530, filed on Oct. 19, 2018, which are hereby incorporated by reference in their entirety.

TECHNICAL FIELD

The present invention relates to a top insulator for a secondary battery and a method for manufacturing the same, and more particularly, to a top insulator for a secondary battery, which is improved in properties such as heat resistance and chemical resistance and is suppressed in generation of dust during punching, and a method for manufacturing the same.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In general, in order to manufacture the lithium secondary battery, first, electrode active material slurry is applied to a positive electrode collector and a negative electrode collector to manufacture a positive electrode and a negative electrode. Then, the electrodes are stacked on both sides of a separator to form an electrode assembly. Also, the electrode assembly is accommodated in a battery case, an electrolyte is injected, and then, sealing is performed.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material having a variable shape. Also, in the can type secondary battery, an electrode assembly is accommodated in a case made of a metal or plastic material having a predetermined shape.

The can type secondary battery is classified into a prismatic type secondary battery in which the case has a polygonal shape and a cylinder type secondary battery in which the battery case has a cylindrical shape according to the shape of the battery case.

FIG. 1 is a partial cross-sectional view of a cylindrical secondary battery 2 according to the related art.

In general, as illustrated in FIG. 1, the cylindrical secondary battery 2 includes a cylindrical battery can 12, a jelly-roll type electrode assembly 13 accommodated in the battery can 12, a cap assembly 11 coupled to an upper portion of the battery can 12, a beading part 14 disposed on a front end of the battery can 12 to mount the cap assembly 11, and a crimping part 15 for sealing the battery can 12.

The cap assembly 11 has a structure in which a top cap 111 sealing an opening of the battery can 12 and forming a positive electrode terminal, a PTC element 112 that interrupts current by increasing resistance when an internal temperature of the battery increases, a safety vent 113 that interrupts current when an internal pressure of the battery increases due to abnormal current and exhausts an internal gas, a CID gasket 114 electrically separating the safety vent from a CID filter 115 except for a specific portion, and the CID filter 115 to which a positive electrode lead connected to a positive electrode is connected and which interrupts current when a high pressure is generated in the battery, are sequentially stacked.

Also, the cap assembly 11 is installed on a beading part 14 of the battery can 12 in a state of being mounted on a crimping gasket 116. Thus, under normal operation conditions, a positive electrode of the electrode assembly 13 is electrically connected to the top cap 111 via the positive electrode lead 131, the CID filter 115, the safety vent 113, and the PTC element 112.

An insulator 26 is disposed on each of the upper and lower ends of the electrode assembly 13. Here, a top insulator 26 disposed on the upper end insulates the electrode assembly 13 from the cap assembly 11, and a bottom insulator (not shown) disposed on the lower end insulates the electrode assembly 13 from a bottom part of the battery can 12.

However, in the case of the cylindrical secondary battery 2 according to the related art, the top insulator is made of a thermoplastic resin such as polyethylene or polypropylene, which has insulating property and electrolyte resistance and is excellent in punching processability. However, the thermoplastic resin has a considerably low melting point of 200° C. to 250° C. Also, there is a problem that when an internal temperature of the secondary battery 2 increases sharply to exceed 250° C., the top insulator 26 is melted to cause short circuit. To solve this problem, although a technique of increasing a thickness of the top insulator 26 has been proposed, there is a problem that capacity and efficiency of the battery are reduced due to a decrease in an internal space of the secondary battery 2.

In recent years, a technology has been proposed in which the top insulator 26 is manufactured by applying phenol, which is a thermosetting resin, to a glass fiber fabric. However, a melting point of phenol itself is very low at a temperature of 40° C., and even if it is applied to the glass fiber fabric, there is a problem that a mass decreases by being oxidized into carbon dioxide or carbon monoxide at a temperature of 600° C. Also, when the glass fiber fabric is coated with phenol and then punched in a round disc shape, a large amount of dust is generated. Thus, it is difficult to continuously produce the product, resulting in a decrease in production amount and an increase in manufacturing cost.

DISCLOSURE OF THE INVENTION

Technical Problem

To solve a problem to be solved, an object of the present invention is to provide a top insulator for a secondary battery, which is improved in properties such as heat resistance and chemical resistance and is suppressed in generation of dust during punching, and a method for manufacturing the same.

The objects of the present invention are not limited to the aforementioned object, but other objects not described herein will be clearly understood by those skilled in the art from descriptions below.

Technical Solution

To solve the above problem, a method for manufacturing a top insulator configured to be inserted into a case of a secondary battery, according to an embodiment of the present invention includes: preparing a top insulator fabric by applying a silicone rubber to at least one surface of a glass fiber fabric formed by crossing weft yarns and warp yarns of glass fiber raw yarns; and punching the top insulator fabric.

Also, the preparing the top insulator fabric may include applying first silicone rubber, and wherein the applying the first silicone rubber may include: applying a first solution, in which a first silicone polymer is dissolved, to the at least one surface; and drying the applied first solution to apply the first silicone rubber.

Also, the preparing the top insulator fabric may further include applying second silicone rubber, wherein, after the applying the first silicone rubber, the applying the second silicone rubber may include: applying a second solution, in which a second silicone polymer is dissolved, to the at least one surface; and drying the applied second solution to apply the second silicone rubber.

Also, the applying the first silicone rubber may be performed so that the first silicone rubber is attached to the glass fiber raw yarns, and a pore is formed between the glass fiber raw yarns.

Also, the pore may be a pore formed between the glass fiber raw yarns that are perpendicular to each other.

Also, in applying the second silicone rubber, the second silicone rubber may be inserted into the pore.

Also, the first solution may have a viscosity less than that of the second solution.

Also, after the applying the second silicone rubber, the first silicone rubber and the second silicone rubber may be stacked on at least one surface of the glass fiber fabric.

Also, after the applying the first silicone rubber, the first silicone rubber may be stacked on at least one surface of the glass fiber fabric.

Also, after the preparing the top insulator fabric, the glass fiber fabric and the top insulator fabric may have a same thickness.

Also, in the punching the glass fiber, the glass fiber may be punched to have a disc shape.

Also, in the preparing the top insulator fabric, the silicone rubber may be applied to all surfaces of the glass fiber fabric.

To solve the above problem, a top insulator to be inserted into a case of a secondary battery, according to an embodiment of the present invention includes: a glass fiber including crossed weft yarns and warp yarns of raw yarns of the glass fiber; and a silicone rubber on at least one surface of the glass fiber, wherein the top insulator is heat resistant to a temperature of at least 250° C.

Also, when heated at a temperature of 600° C., a mass loss due to pyrolysis of the top insulator may be 10 wt % to 15 wt %.

Also, when heated at a temperature of 950° C., the mass loss of the top insulator may be 10 wt % to 15 wt %.

Also, when heated at the temperature of 950° C., the mass loss of the top insulator may be 12 wt % to 14 wt %.

Also, when impregnated into an electrolyte containing 10 wt % or more of lithium bis(fluorosulfonyl)imide (LIFSI) and stored for 1 week or more at a temperature of 72° C., a reduction amount of lithium bis(fluorosulfonyl)imide (LIFSI) may be 1 wt % to 3 wt %.

Also, when impregnated into the electrolyte containing 10 wt % or more of lithium bis(fluorosulfonyl)imide (LIFSI) and stored for 1 week or more at the temperature of 72° C., the reduction amount of lithium bis(fluorosulfonyl)imide (LIFSI) may be 1.5 wt % to 2.5 wt %.

Also, when the secondary battery is heated at a temperature of 600° C. or more so as to be exploded, a pinhole may be not formed in the battery case.

Also, when the top insulator is stretched to both sides, a tensile strength may be 120 N/mm$^2$ to 150 N/mm$^2$, and an elongation may be 5% to 10%.

Also, when the top insulator is stretched to both sides, the tensile strength may be 130 N/mm$^2$ to 140 N/mm$^2$, and the elongation may be 7% to 8%.

Particularities of other embodiments are included in the detailed description and drawings.

Advantageous Effects

The embodiments of the present invention may have at least the following effects.

The silicone rubber may be applied to the glass fiber fabric to manufacture the top insulator for the secondary battery, thereby improving the properties such as the heat resistance and the chemical resistance.

In addition, when the top insulator fabric is punched to manufacture the top insulator for the secondary battery, the generation of the dust may be suppressed to enable the products to be continuously produced, increase in production amount, and decrease in manufacturing cost.

Also, the top insulator fabric may have the flexibility and be easily rolled to easily form the mother roll, and thus, the top insulator for the secondary battery may be easily manufactured.

The effects of the prevent invention are not limited by the aforementioned description, and thus, more varied effects are involved in this specification.

MODE FOR CARRYING OUT THE INVENTION

Figure 1:
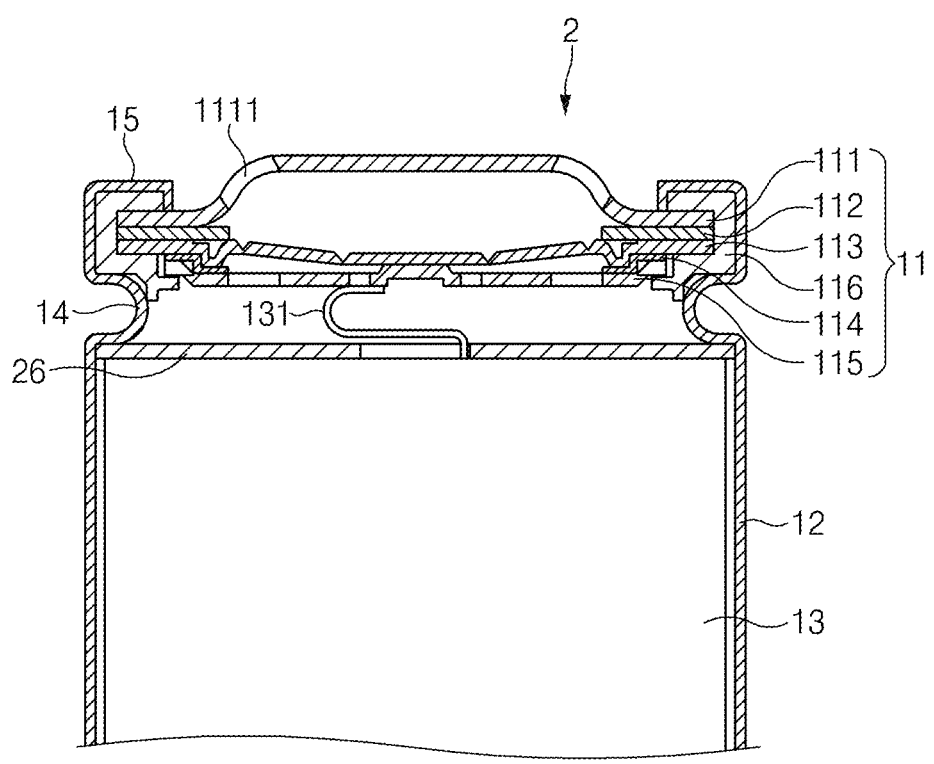
FIG. 1 is a partial cross-sectional view of a cylindrical secondary battery according to a related art.

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

Figure 2:
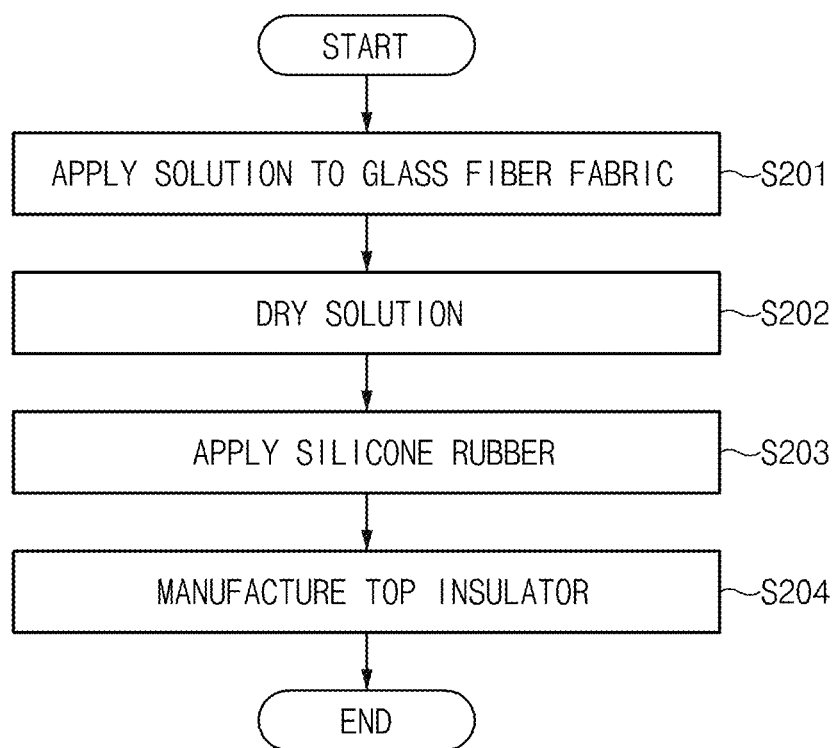
FIG. 2 is a flowchart illustrating a method for manufacturing a top insulator according to an embodiment of the present invention.

FIG. 2 is a flowchart illustrating a method for manufacturing a top insulator 16 according to an embodiment of the present invention.

The top insulator 16 according to an embodiment of the present invention is manufactured by applying silicone rubber 162 to a glass fiber fabric 161. Thus, properties such as heat resistance and chemical resistance may be improved. Also, when a top insulator fabric is punched to manufacture the top insulator 16 for the secondary battery, generation of dust may be suppressed to enable products to be continuously produced, increase in production amount, and decrease in manufacturing cost. Also, the top insulator fabric may have the flexibility and be easily wounded to easily form a mother roll, and thus, the top insulator 16 for the secondary battery may be easily manufactured.

Hereinafter, specific contents of each steps illustrated in the flowchart of FIG. 2 will be described with reference to FIGS. 3 to 5.

Figure 3:
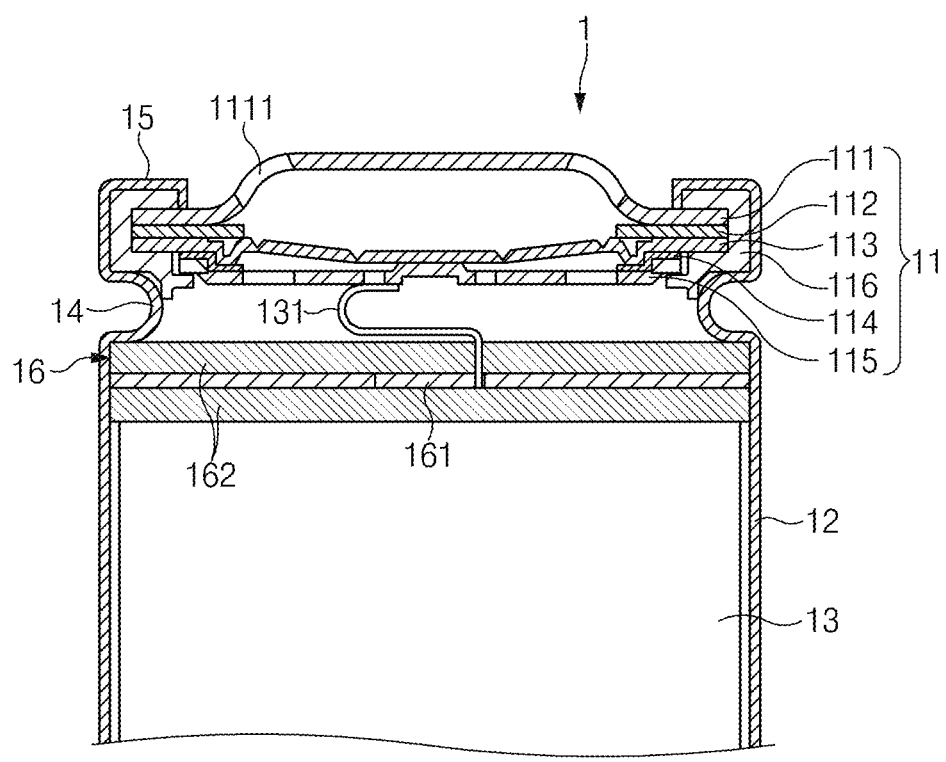
FIG. 3 is a partial cross-sectional view of a cylindrical secondary battery according to an embodiment of the present invention.

FIG. 3 is a partial cross-sectional view of a cylindrical secondary battery 1 according to an embodiment of the present invention.

As illustrated in FIG. 3, the cylindrical secondary battery 1 according to an embodiment of the present invention includes a battery can 12, a jelly-roll type electrode assembly 13 accommodated in the battery can 12, a cap assembly 11 coupled to an upper portion of the battery can 12, a beading part 14 disposed on a front end of the battery can 12 to mount the cap assembly 11, and a crimping part 15 for sealing the battery can 12. The cylindrical secondary battery 1 may be used as a power source for a mobile phone, a notebook computer, an electric vehicle, and the like, which stably supplies a constant output.

The battery can 12 may be made of a lightweight conductive metal material such as aluminum, nickel, stainless steel, or an alloy thereof. The battery can 12 may have an opened upper portion and a closed bottom portion that is opposite to the upper portion. An electrolyte together with the electrode assembly 13 may be accommodated in an inner space of the battery can 12. Although the battery can 12 has a cylindrical shape, the present invention is not limited thereto. For example, the battery can 12 may have various shape such as a prismatic shape in addition to the cylindrical shape.

The electrode assembly 13 may have a stack structure including two electrode plates such as a positive electrode plate and a negative electrode plate, each of which has a wide plate shape in the form of a roll and a separator disposed between the electrode plates to insulate the electrode plates from each other or disposed on at a left or right side of one electrode plate. The stack structure may have various shapes, for example, may be wound in the form of a jelly roll or be staked in a shape in which the positive electrode plate and the negative electrode plate, each of which has a predetermined size, are stacked with the separator therebetween. Each of the two electrode plates has a structure in which active material slurry is applied to a metal foil or a mesh-shaped collector including aluminum and copper. The slurry may be usually formed by agitating a granular active material, an auxiliary conductor, a binder, and a plasticizer with a solvent added. The solvent may be removed in the subsequent process. A non-coating portion on which the slurry is not applied may be disposed at a starting end and a distal end of the collector in a direction in which the electrode plate is wound. A pair of leads, which respectively correspond to the electrode plates, are attached to the non-coating portion. The positive electrode lead 131 attached to an upper end of the electrode assembly 13 may be electrically connected to the cap assembly 11, and the negative electrode lead (not shown) attached to a lower end of the electrode assembly 13 may be connected to a bottom surface of the battery can 12. However, the present invention is not limited thereto. For example, all the positive electrode lead 131 and the negative electrode lead may be withdrawn in a direction of the cap assembly 11.

The top insulator 16 insulating each of the electrode assemblies 13 is disposed on each of upper and lower ends of the electrode assembly 13. Here, the top insulator 16 disposed on the upper end is disposed between the electrode assembly 13 and the cap assembly 11 to insulate the electrode assembly 13, and the bottom insulator (not shown) disposed on the lower end is disposed between the electrode assembly 13 and the bottom part of the battery cab 12 to insulate the electrode assembly 13. As illustrated in FIG. 3, the insulator 16 according to an embodiment of the present invention may be the top insulator 16 disposed on the upper portion of the electrode assembly, but is not limited thereto. For example, the insulator 16 may be a bottom insulator (not shown) disposed on the lower portion of the electrode assembly. The top insulator 16 according to an embodiment of the present invention will be described later.

A center pin (not shown) that prevents the electrode assembly 13 wound in the form of the jelly roll from being unwound and serves as a moving path of a gas within the secondary battery 1 may be inserted into a center of the battery can 12.

The electrolyte filled into the battery can 12 may move lithium ions generated by electrochemical reaction of the electrode plates during charging and discharging of the secondary battery 1. The electrolyte may include a non-aqueous organic electrolyte that is a mixture of a lithium salt and a high-purity organic solvent or a polymer using a polymer electrolyte.

The cap assembly 11 may be coupled to an opening formed in the upper end of the battery can 12 to seal the opening of the battery can 12. The cap assembly 11 may have various shapes such as a circular shape or a prismatic shape according to the shape of the battery can 12. According to an embodiment, the battery can 12 has the cylindrical shape. In this case, the cap assembly 11 may also have a disk shape corresponding to the shape of the battery can 12.

According to an embodiment of the present invention, the cap assembly 11 may have a structure in which a top cap 111 sealing the opening of the battery can 12 and forming the positive electrode terminal, a safety vent 113 that interrupts current when an internal pressure of the battery increases due to abnormal current and exhausts a gas within the battery, and a current interrupt device to which a positive lead 131 connected to the positive electrode of the electrode assembly 13 is connected and which interrupts current when a high pressure occurs in the battery are sequentially stacked. Also, the cap assembly 11 is installed on a beading part 14 of the battery can 12 in a state of being mounted on a crimping gasket 116. Thus, under normal operation conditions, a positive electrode of the electrode assembly 13 is electrically connected to the top cap 111 via the positive electrode lead 131, the current interrupt device, the safety vent 113, and the PTC element 112.

The top cap 111 is disposed on the uppermost portion of the cap assembly 11 in a shape protruding upward to form the positive electrode. Thus, the top cap 111 may be electrically connected to a load or an external device such as a charging device. A gas hole 1111 through which the gas generated in the secondary battery 1 is discharged may be formed in the top cap 111. Thus, when the internal pressure increases due to the generation of the gas from the electrode assembly 13 due to overcharging or the like, a CID filter 115 of the current interrupt device and the safety vent 113 may be ruptured, and thus, the internal gas may be discharged to the outside through the ruptured portion and the gas hole 1111. Thus, the charging and discharging are not performed any more to secure safety of the secondary battery 1. The top cap 111 may be made of a metal material such as stainless steel or aluminum.

A portion of the top cap 111 contacting the safety vent 113 may not be specifically limited in thickness as long as the portion of the top cap 111 protects various components of the cap assembly 11 from a pressure applied from the outside, i.e., may have a thickness of 0.3 mm to 0.5 mm. When the thickness of the portion of the top cap 111 is too thin, it may be difficult to exhibit mechanical rigidity. On the other hand, when the thickness of the portion of the top cap 111 is too thick, capacity of the battery may be reduced due to an increase in size and weight when compared to the same standard.

The safety vent 113 may serve for interrupting the current when the internal pressure of the battery increases due to the abnormal current or exhausting the gas and may be made of a metal material. The thickness of the safety vent 113 may vary according to a material, a structure, and the like thereof. That is, the thickness of the safety vent 113 is not specifically limited as long as the safety vent 113 discharges the gas while being ruptured when a predetermined high pressure is generated in the battery. For example, the safety vent 113 may have a thickness of 0.2 mm to 0.6 mm.

The current interrupt device (CID) may be disposed between the safety vent 113 and the electrode assembly 13 to electrically connect the electrode assembly 13 to the safety vent 113. The current interrupt device includes a CID filter 115 contacting the safety vent 113 to transmit the current and a CID gasket 114 spatially separating and isolating the CID filter 115 and the safety vent 113 from each other.

Thus, the current generated from the electrode assembly 13 flows into the safety vent 113 via the positive lead 131 and the CID filter 115 in a normal state so that the secondary battery is discharged. However, when the internal pressure of the secondary battery 1 increases due to the abnormal current, the internal pressure of the battery may increase by the gas generated in the secondary battery 1 due to the abnormal current. Thus, the connection between the safety vent 113 and the CID filter 115 may be interrupted, or the CID filter 115 may be ruptured. Therefore, the electrical connection between the safety vent 113 and the electrode assembly 13 may be interrupted to secure the safety.

The cap assembly 11 may further include a positive temperature coefficient (PTC) element 112 between the safety vent 113 and the top cap 111. The PTC element 112 may increase battery resistance when the internal temperature increases to interrupt the current. That is, the PTC element 112 electrically connects the top cap 111 to the safety vent 113 in the normal state. However, in the abnormal state, for example, when the temperature abnormally increases, the PTC element 112 interrupts the electrical connection between the top cap 111 and the safety vent 113. The PTC element 112 may also vary in thickness according to the material, the structure, and the like thereof, for example, may have a thickness of 0.2 mm to 0.4 mm. When the PTC element 112 has a thickness greater than 0.4 mm, the internal resistance may increase, and also, the battery may increase in size to reduce the battery capacity when compared to the same standard. On the other hand, when the PTC element 112 has a thickness less than 0.2 mm, it may be difficult to exhibit the current interrupt effect at a high temperature, and the PTC element 112 may be destroyed by a weak external impact. Thus, the thickness of the PTC element 112 may be appropriately determined within the above-described thickness range in consideration of these points in combination.

Even when the secondary battery 1 including the above-described cap assembly 11 is used as a power source for a power tool such as an electric drill, the secondary battery 1 may instantaneously provide an high output and be stable against an external physical impact such as vibration and dropping.

The beading part 14 bent inward from the outside may be formed on the upper portion of the battery can 12. The beading part 14 may allow the cap assembly 11, on which the top cap 111, the PTC element 112, the safety vent 113, and the current interrupt device are stacked, to be disposed on an upper end of the battery can 12, thereby preventing the electrode assembly 13 from moving vertically.

As described above, the cap assembly 11 is installed on the beading part 14 of the battery can 12 in the state of being mounted on the crimping gasket 116. The crimping gasket 116 may have a cylindrical shape with both opened ends. As illustrated in FIG. 3, one end of the crimping gasket 116, which faces the inside of the battery can 12, may be primarily bent substantially vertically toward a central axis and then secondarily bent vertically toward the inside of the battery can 12 and be seated on the beading part 14. Also, the crimping gasket 116 has the other end that initially extends in a direction parallel to the central axis. However, when a process of coupling the cap assembly 11 and pressing an outer wall of an upper end of the battery can 12 to form a crimping part 15 is performed later, the crimping gasket 116 may be bent in a direction that is substantially vertical along the shape of the crimping part 15 to proceed to the central axis. Thus, the crimping gasket 116 has an inner circumferential surface that is closely attached to the cap assembly 111 and an outer circumferential surface that is closely attached to an inner circumferential surface of the battery can 12.

Figure 4:
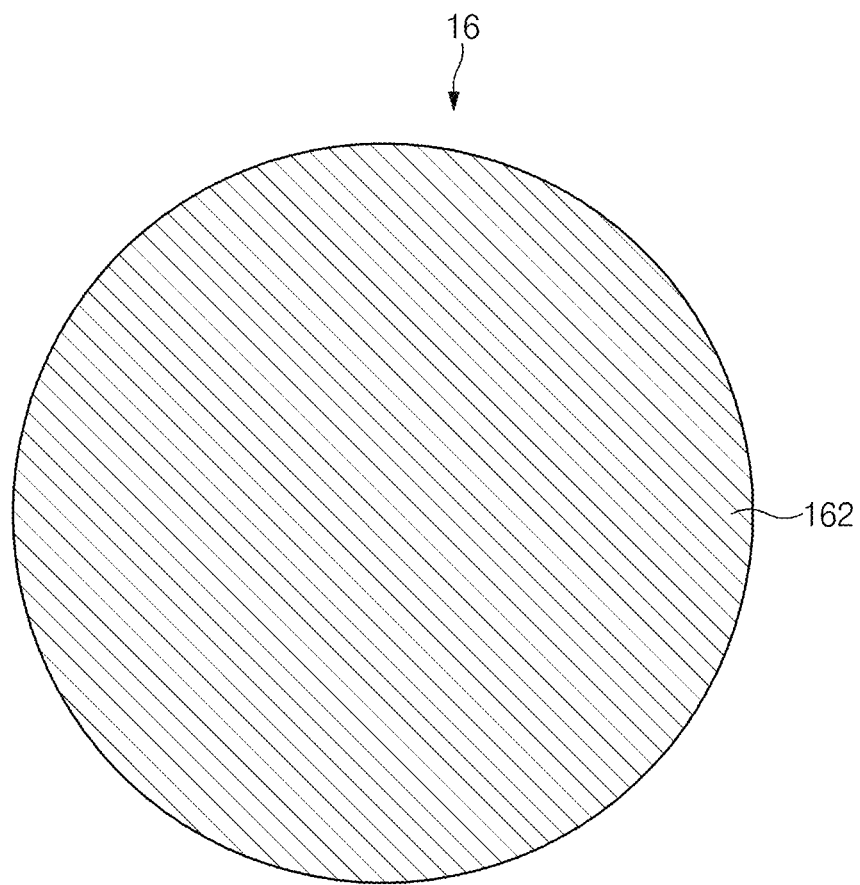
FIG. 4 is a plan view of the top insulator according to an embodiment of the present invention.

FIG. 4 is a plan view of the top insulator 16 according to an embodiment of the present invention.

The top insulator 16 for the secondary battery 1, which is inserted into a case of the secondary battery 1, according to an embodiment of the present invention includes: a disc-shaped glass fiber 161 which is formed by crossing weft yarns and warp yarns of raw yarns of the glass fiber 161; and silicone rubber 162 applied to at least one surface of the glass fiber 161. Also, the silicone rubber 162 is stacked on at least one surface of the glass fiber 161.

The glass fiber 161 is manufactured in a long fiber shape by melting glass in a platinum furnace and drawing the melted glass through a small-diameter hole. The glass fiber may have excellent in heat resistance, durability, sound-absorbing properties, electric insulation, rust-proof, and easy processability and thus be mainly used for building insulation materials, air filtering materials, electric insulating materials, and the like. According to an embodiment of the present invention, the weft yarns and warp yarns of the raw yarns of the glass fiber 161 may cross each other to prepare a fabric of the glass fiber 161, and the silicone rubber 162 is applied to the fabric of the glass fiber 161. It is preferable that a cross-section of one strand of the yarn loosened from the glass fiber 161 has a diameter of approximately 4 μm to 15 μm.

The silicone rubber 162 is rubber containing silicon. The silicone rubber may have excellent heat resistance and chemical resistance. Thus, strength and elongation of the silicone rubber may be maintained within 10% even after being left for 3 days at a temperature of 250° C., and elasticity of the silicone rubber may also be maintained at a temperature of −45° C. Since electrical characteristics are not sensitive to temperature, the silicone rubber is widely used in electric, electronic and communication fields requiring the heat resistance. The silicone rubber 162 is prepared by mixing various materials. For example, a silicone polymer such as an organopolysiloxane is used as a raw material. A silica-based filler, a bulking agent for increasing a volume, a vulcanizing agent such as organic peroxides, a processing material such as a low-molecular-weight silicone oligomer, or various property improving agents such as BaO, CaO, MgO, and ZnO may be mixed. Furthermore, in order to increase in flame retardancy, flame retardants such as $Al(OH)_3$, $Mg(OH)_2$, and $BH_3O_3$ may be further contained, or pigments may be further contained to facilitate quality inspection with the naked eye. Also, the silicone rubber 162 may be prepared by mixing and heating the above materials, followed by vulcanization and drying processes. The peroxide such as benzoyl peroxide, dicumyl peroxide, and the like may be used for the vulcanization process.

To manufacture the top insulator 16 for the secondary battery according to an embodiment of the present invention, first, various materials containing the silicone polymer are dissolved in a specific solvent to prepare a solution before being mixed and cured. The solvent is preferably an organic solvent capable of easily dissolving the above materials. For example, the solvent includes toluene, xylene, MEK, and the like.

The prepared solution has a different viscosity depending on a concentration at which the silicone polymer is dissolved. Here, if the viscosity is too low, the weft yarns and warp yarns of the glass fiber 161 may be loosened, and an effect of coating may not be considerable. On the other hand, if the viscosity is too high, the solution is not penetrated into a pore 3 between the weft yarns and warp yarns of the glass fiber 161, and the pore 3 may not be filled. The viscosity of the solution may be selected experimentally as an optimum viscosity.

Also, the prepared solution is applied to the fabric of the glass fiber 161 (S201) and then dried (S202). When the solution is applied, the solution may be sprayed onto the glass fiber 161 by using a spray. However, it is preferable to immerse the glass fiber 161 in a container containing the solution. As a result, a large amount of solution may be quickly applied to the fabric of the glass fiber 161. When the solution is applied and dried, the solvent is evaporated, and the silicone rubber 162 is applied to the fabric of the glass fiber 161 to form the top insulator fabric (S203). Also, the top insulator fabric is punched in a specific shape, the top insulator 16 according to an embodiment of the present invention is manufactured (S204). Here, when the top insulator 16 is installed in the cylindrical secondary battery 1, as illustrated in FIG. 4, the top insulator fabric is preferably punched in a disc shape so that the top insulator 16 is easily inserted into the battery can 12 of the cylindrical secondary battery 1. Thus, the top insulator 16 may be manufactured by applying the silicone rubber 162 to the glass fiber 161 having the disc shape as a whole.

Figure 5:
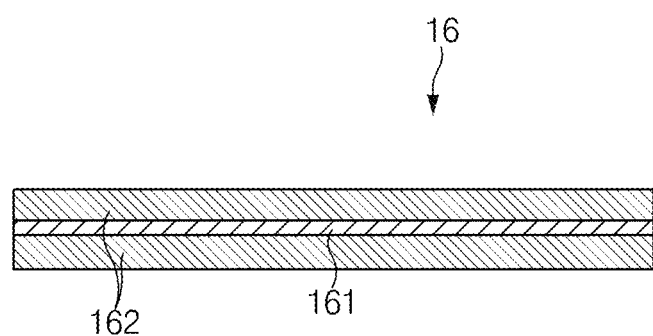
FIG. 5 is a side view of the top insulator according to an embodiment of the present invention.

FIG. 5 is a side view of the top insulator 16 according to an embodiment of the present invention.

As illustrated in FIG. 5, the top insulator 16 according to an embodiment of the present invention has a shape in which a plurality of layers are stacked while the silicone rubber 162 is applied to at least one surface of the glass fiber 161.

The solution may be applied to only one surface of the fabric of the glass fiber 161. However, according to an embodiment of the present invention, the solution may be preferably applied to all both surfaces of the fabric of the glass fiber 161. As a result, the silicone rubber 162 may be applied to both surfaces of the glass fiber 161 so that the top insulator 16 according to an embodiment of the present invention has the shape in which the plurality of layers are stacked. Although three layers are stacked in FIG. 5, the embodiment of the present invention is not limited thereto. For example, a separate layer may be further provided between the glass fiber 161 and the silicone rubber 162.

Figure 6:
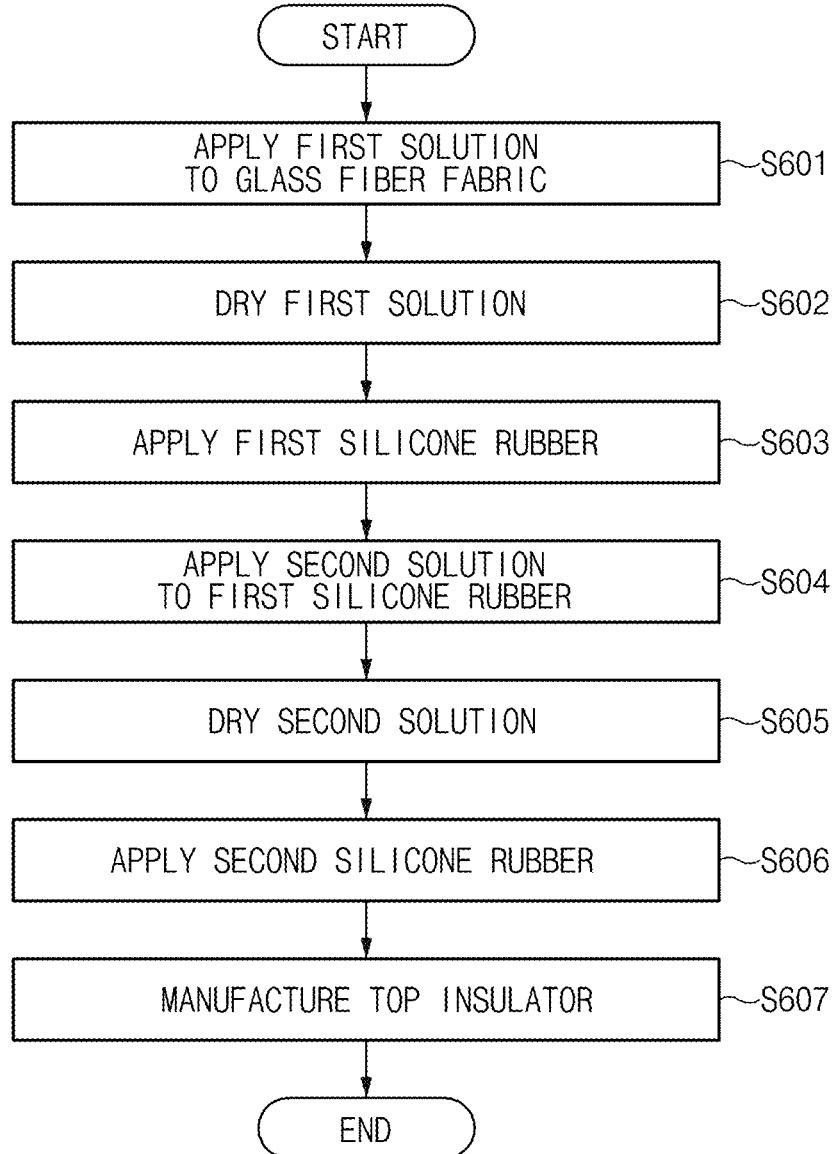
FIG. 6 is a flowchart illustrating a method for manufacturing a top insulator according to another embodiment of the present invention.

FIG. 6 is a flowchart illustrating a method for manufacturing a top insulator 16 according to another embodiment of the present invention.

The top insulator 16 according to an embodiment of the present invention is manufactured by applying silicone rubber 162 to at least one surface of a glass fiber 161 once. On the other hand, a top insulator 16a according to another embodiment of the present invention is manufactured by applying silicone rubber 162a to at least one surface of a glass fiber 161a several times.

Hereinafter, specific contents of each steps illustrated in the flowchart of FIG. 6 will be described with reference to FIGS. 7 to 8.

Figure 7:
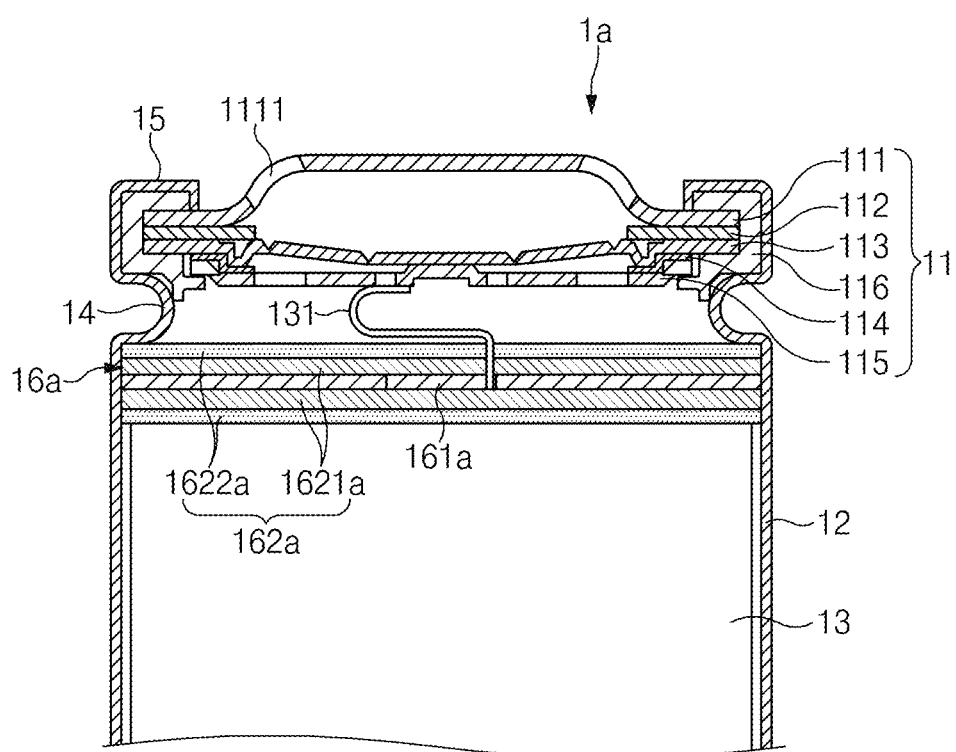
FIG. 7 is a partial cross-sectional view of a cylindrical secondary battery according to another embodiment of the present invention.

FIG. 7 is a partial cross-sectional view of a cylindrical secondary battery 1a according to another embodiment of the present invention.

Hereinafter, descriptions of a cylindrical secondary battery 1a and a top insulator 16a according to another embodiment of the present invention, which are duplicated with those of the secondary battery according to the abovementioned embodiment of the present invention will be omitted. This is for convenience of description and is not intended to limit the scope of rights.

The top insulator 16a insulating each of electrode assemblies 13 is disposed on each of upper and lower ends of the electrode assembly 13. As illustrated in FIG. 7, the insulator 16a according to another embodiment of the present invention may be the top insulator 16a disposed on the upper portion of the electrode assembly, but is not limited thereto. For example, the insulator 16a may be a bottom insulator (not shown) disposed on the lower portion of the electrode assembly.

The top insulator 16a for the secondary battery 1a, which is inserted into a case of the secondary battery 1a, according to another embodiment of the present invention includes: a glass fiber 161a which is formed by crossing weft yarns and warp yarns of raw yarns of the glass fiber 161a; and silicone rubber 162a applied to at least one surface of the glass fiber 161a. Also, the silicone rubber 162a includes: first silicone rubber 1621a applied first to at least one surface of the glass fiber 161a; and second silicone rubber 1622a applied to the first silicone rubber 1621a. To manufacture the top insulator 16a according to another embodiment of the present invention, first, various materials containing the silicone polymer are dissolved in a specific solvent to prepare first and second solutions before being mixed and cured.

Particularly, a first silicone polymer is dissolved in a first solvent to prepare the first solution, and a second silicone polymer is dissolved in a second solvent to prepare the second solution. The prepared solutions have different viscosities depending on a concentration at which the silicone polymer is dissolved. Here, it is preferable that the first solution has a viscosity greater than that of the second solution.

Also, the prepared first solution is applied to at least one surface of the fabric of the glass fiber 161a (S601) and then dried (S602). The first solution may be applied to only one surface of the fabric of the glass fiber 161a. However, according to another embodiment of the present invention, the solution may be preferably applied to all both surfaces of the fabric of the glass fiber 161a. When the first solution is applied and dried, the first solvent is evaporated, and the first silicone rubber 1621a is applied to the glass fiber 161a (S603). Thereafter, the prepared second solution is applied to at least one surface to which the first silicone rubber 1621 is applied (S604) and then dried (S605). When the second solution is applied and dried, the second solvent is evaporated, and the second silicone rubber 1622a is applied to the first silicone rubber 1622a (S606). As a result, a top insulator fabric is prepared.

Since the first solution has a low viscosity, the first solution may be easily penetrated into a pore 3 between weft yarns and warp yarns of the fabric of the glass fiber 161a to fill the pore 3. On the other hand, the second solution has a high viscosity to fix the weft yarns and the warp yarns of the fabric of the glass fiber 161a without being loosened, thereby increasing in holding force. Thus, in the top insulator 16a according to another embodiment of the present invention, the silicone rubber 162a may be better mixed with the glass fiber 161a to increase in holding force.

The top insulator fabric is punched in a specific shape, the top insulator 16a according to another embodiment of the present invention is manufactured (S607). Here, when the top insulator 16a is installed in the cylindrical secondary battery 1a, the top insulator fabric is preferably punched in a disc shape so that the top insulator 16a is easily inserted into a battery can of the cylindrical secondary battery 1a.

Figure 8:
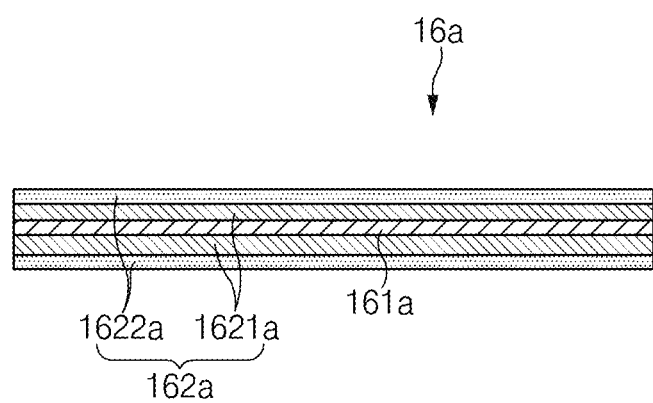
FIG. 8 is a side view of a top insulator according to another embodiment of the present invention.

FIG. 8 is a side view illustrating the top insulator 16a according to another embodiment of the present invention.

As illustrated in FIG. 8, in the top insulator 16a according to another embodiment of the present invention, the first silicone rubber 1621a is stacked on at least one surface of the glass fiber 161a, and the second silicone rubber 1622a is stacked on the first silicone rubber 1621a. That is, the first and second silicone rubber 1621a and 1622a are sequentially stacked to form a shape in which a plurality of layers are stacked.

The first and second solutions may be applied to only one surface of the fabric of the glass fiber 161a. However, according to another embodiment of the present invention, the solutions may be preferably applied to all both surfaces of the fabric of the glass fiber 161a. As a result, the first and second silicone rubber 1621a and 1622a may be applied to both surfaces of the glass fiber 161a so that the top insulator 161a according to another embodiment of the present invention has the shape in which the plurality of layers are stacked. Particularly, since the first silicone rubber 1621a is applied before the second silicone rubber 1622a is applied, the first silicone rubber 1621a is stacked inside the second silicone rubber 1622a, and the second silicone rubber 1622a is stacked outside the first silicone rubber 1621a. Although five layers are stacked in FIG. 8, this embodiment of the present invention is not limited thereto. For example, a separate layer may be further provided between the glass fiber 161a and the silicone rubber 1621a and 1622a.

Figure 9:
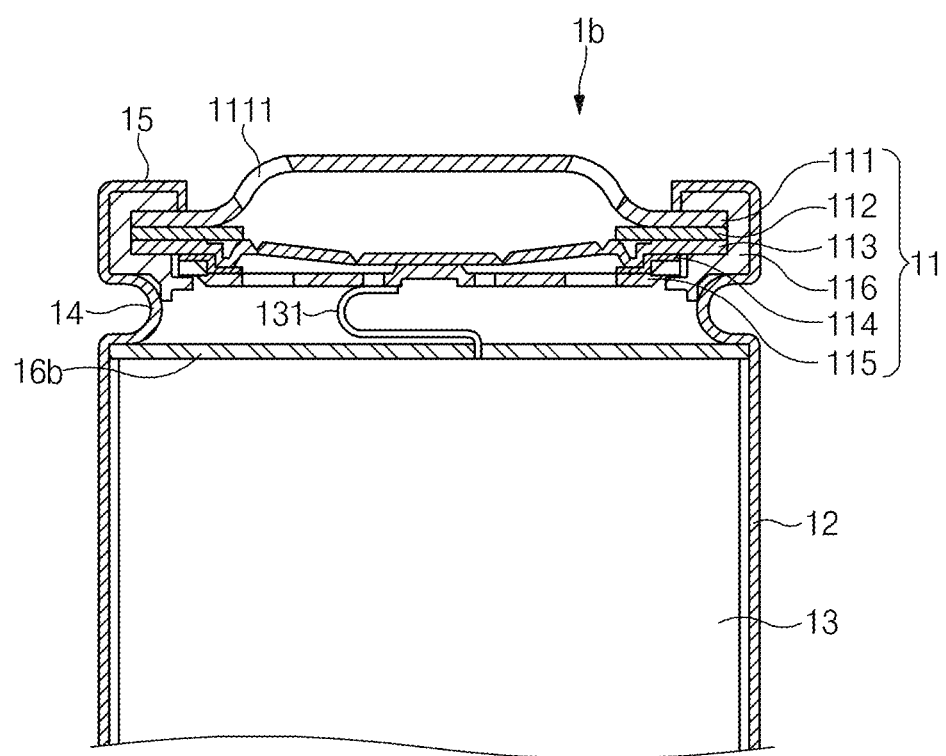
FIG. 9 is a partial cross-sectional view of a cylindrical secondary battery according to further another embodiment of the present invention.

FIG. 9 is a partial cross-sectional view of a cylindrical secondary battery 1b according to further another embodiment of the present invention.

In the top insulator 16 according to an embodiment of the present invention and the top insulator 16a according to another embodiment of the present invention, each of the silicone rubber 162 and 162a is applied to at least one surface of each of the glass fiber 161 and 161a to form the shape in which the plurality of layers are stacked. However, in a top insulator 16b according to further another embodiment of the present invention, silicone rubber 162b is not stacked on a glass fiber 161b, and thus, the top insulator 16b has the same thickness as the glass fiber 161b.

However, a method for manufacturing the top insulator 16b according to further another embodiment of the present invention is similar to the method for manufacturing the top insulator 16a according to another embodiment, and thus, a specific content of each of steps illustrated in the flowchart of FIG. 6 will be described again with reference to FIGS. 9 to 16. Hereinafter, descriptions of the cylindrical secondary battery 1b and the top insulator 16b according to further another embodiment of the present invention, which are duplicated with those of the secondary battery according to the abovementioned embodiment of the present invention will be omitted. This is for convenience of description and is not intended to limit the scope of rights.

The top insulator 16b for the secondary battery, which is inserted into a case of the secondary battery, according to further another embodiment of the present invention includes: a glass fiber 161b which is formed by crossing weft yarns and warp yarns of raw yarns of the glass fiber 161b; and silicone rubber 162b applied to at least one surface of the glass fiber 161b. Also, the silicone rubber 162b includes: first silicone rubber 1621b attached to raw yarns of the glass fiber 161b; and second silicone rubber 1622b inserted into a pore 3 formed between the raw yarns of the glass fiber 161b.

To manufacture the top insulator 16b according to further another embodiment of the present invention, a first solution is applied to at least one surface of a fabric of the glass fiber 161b (S601) and then dried (S602). According to further another embodiment of the present invention, it is preferable that the first solution is applied to all both surfaces of the fabric of the glass fiber 161b.

Figure 10:
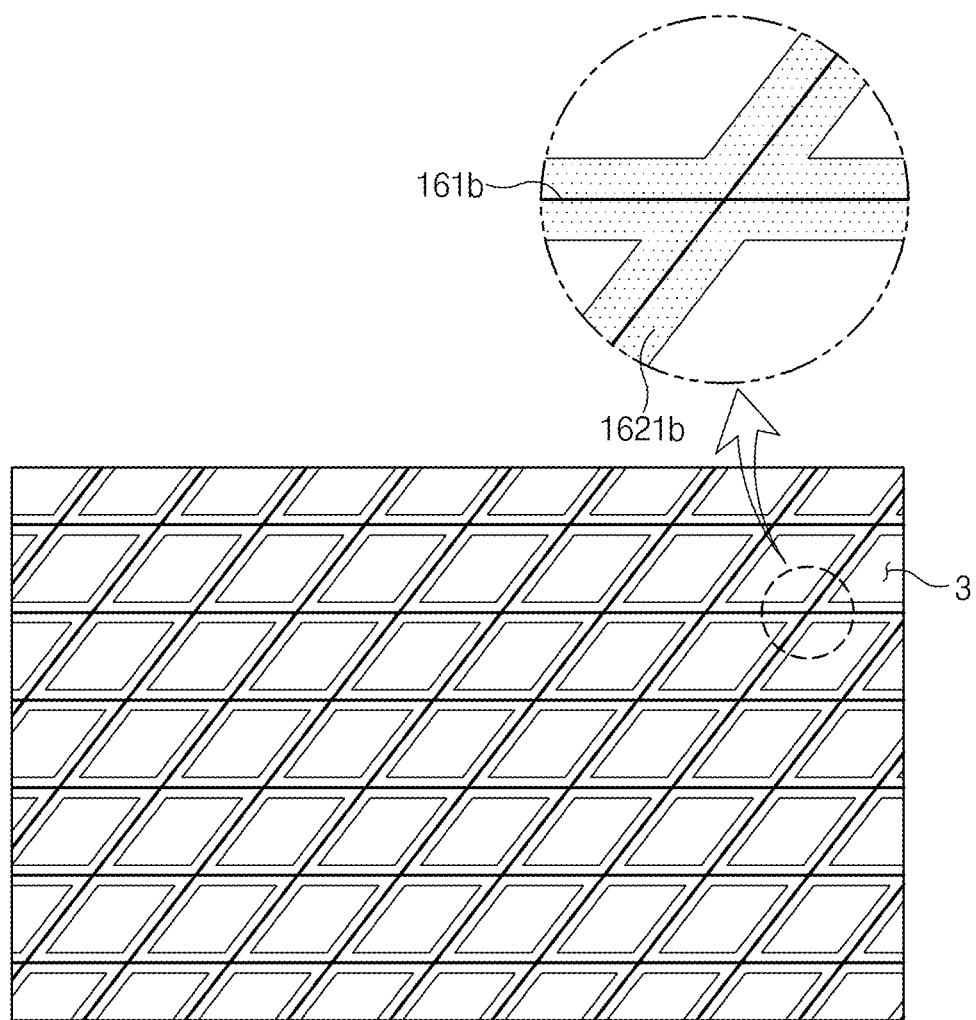
FIG. 10 is a schematic view illustrating a state in which first silicone rubber is applied to a glass fiber fabric according to further another embodiment of the present invention.

FIG. 10 is a schematic view illustrating a state in which the first silicone rubber 1621b is applied to the fabric of the glass fiber 161b according to further another embodiment of the present invention.

The glass fiber 161b is formed by crossing the raw yarns of the glass fiber 161b, and the pore 3 is formed between the raw yarns of the glass fiber 161b that are perpendicular to each other. Here, the first solution has a viscosity less than that of the second solution and also is further less than that of the first solution according to another embodiment of the present invention. Thus, the first solution may adhere to only surrounds of the raw yarns of the glass fiber 161b forming the fabric of the glass fiber 161b.

After the first solution is applied, the fabric of the glass fiber 161b is scraped off with a knife or the like. Thus, the fabric of the glass fiber 161b may be adjusted in thickness. Also, a surface of the fabric of the glass fiber 161b may be smoothed. Also, when the first solution is dried (S602), a first solvent is evaporated. As illustrated in FIG. 10, the first silicone rubber 1621b is applied to the fabric of the glass fiber 161b (S603). Here, according to further another embodiment of the present invention, since the first silicone rubber 1621b is closely attached to adhere to only the raw yarns of the glass fiber 161b, the pore 3 is formed between the raw yarns of the glass fiber 161b, which are perpendicular to each other.

Figure 11:
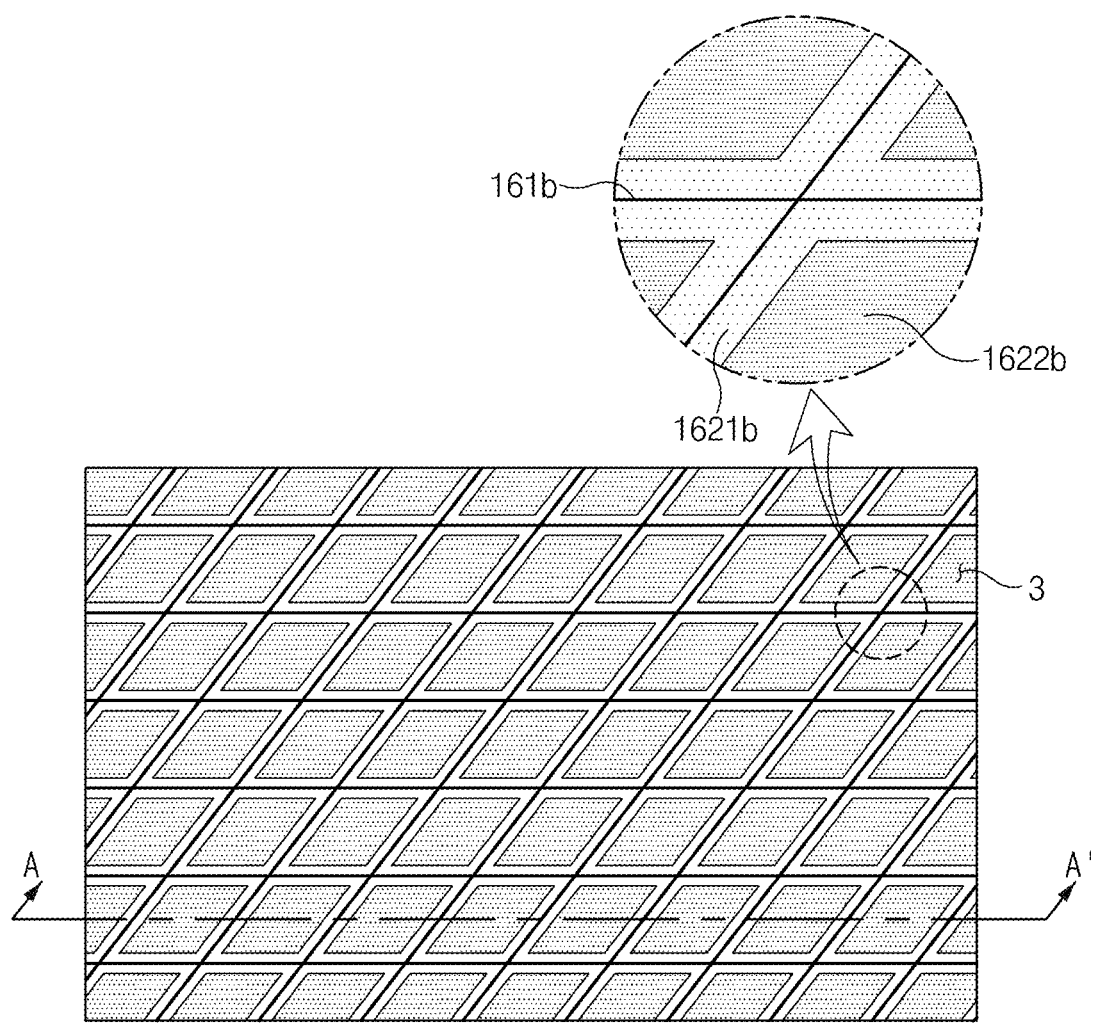
FIG. 11 is a schematic view illustrating a state in which second silicone rubber is applied to the glass fiber fabric according to further another embodiment of the present invention.

FIG. 11 is a schematic view illustrating a state in which the second silicone rubber 1622b is applied to the fabric of the glass fiber 161b according to further another embodiment of the present invention.

Thereafter, the second solution is applied to at least one surface of the fabric of the glass fiber 161b (S604) and then dried (S605). Here, the second solution has the viscosity greater than that of the first solution but less than that of the second solution according to another embodiment of the present invention. Thus, the second solution is inserted into the pore 3 formed between the raw yarns of the glass fiber 161b.

After the second solution is applied, the fabric of the glass fiber 161b is scraped off again with a knife or the like. Thus, the fabric of the glass fiber 161b may be adjusted in thickness. Also, a surface of the fabric of the glass fiber 161b may be smoothed. Also, when the second solution is dried (S605), a second solvent is evaporated. As illustrated in FIG. 11, the second silicone rubber 1622b is applied to the fabric of the glass fiber 161b (S606). Here, according to further another embodiment of the present invention, the second silicone rubber 1622b is inserted into the pore 3 formed between the raw yarns of the glass fiber 161b, which are perpendicular to each other to fill the pore 3. As a result, a top insulator fabric is prepared.

The top insulator fabric is punched in a specific shape, the top insulator 16b according to further another embodiment of the present invention is manufactured (S607). Here, when the top insulator 16b is installed in the cylindrical secondary battery 1b, the top insulator fabric is preferably punched in a disc shape so that the top insulator 16b is easily inserted into the battery can 12 of the cylindrical secondary battery 1b.

Figure 12:
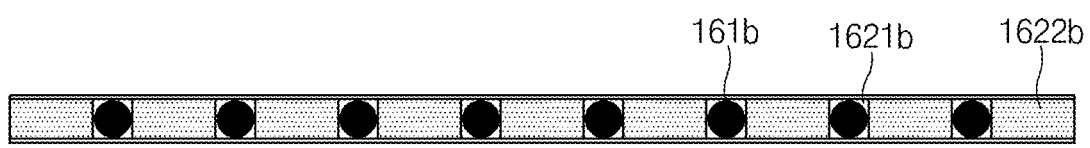
FIG. 12 is a cross-sectional view of a top insulator, taken along line A-A' of FIG. 11 according to further another embodiment of the present invention.

FIG. 12 is a cross-sectional view of the top insulator 16b, taken along line A-A' of FIG. 11 according to further another embodiment of the present invention.

In the top insulator 16b according to further another embodiment of the present invention, as illustrated in FIG. 12, the first and second silicone rubber 162b are not formed as separate layers. That is, the first silicone rubber 1621b is closely attached to adhere to only the raw yarns of the glass fiber 161b, and the second silicone rubber 1622b is inserted into the pore 3 formed between the raw yarns of the glass fiber 161b. Thus, since the first and second silicone rubber 162b are not formed as separate layers, the completed top insulator 16b has a thickness that is equal to or similar to that of the glass fiber 161b to which the silicone rubber 162b is not applied.

As described above, the top insulator 16b insulating each of the electrode assemblies 13 is disposed on each of upper and lower ends of the electrode assembly 13. As illustrated in FIG. 9, the insulator 16b according to an embodiment of the present invention may be the top insulator 16b disposed on the upper portion of the electrode assembly, but is not limited thereto. For example, the insulator 16 may be a bottom insulator (not shown) disposed on the lower portion of the electrode assembly.

When the top insulator 16b according to further another embodiment of the present invention is used as the top insulator 16b, properties such as heat resistance and chemical resistance may be improved to secure thermal and chemical stability. On the other hand, when the insulator 16b is used as the bottom insulator, the thermal and chemical stability may be secured, and also, a heat transfer path through which heat is spread from a lower portion of the electrode assembly 13 may be blocked. According to the related art, the bottom separator may be lost by heat spread through a negative electrode tab of the electrode assembly 13 to cause edge short at a lower portion of the electrode assembly 13. However, the insulator 16*b* according to further another embodiment of the present invention may be used as the bottom insulator to block the heat transfer path through which the heat is spread to the lower portion of the electrode assembly 13, thereby preventing the edge short at the lower portion of the electrode assembly 13.

Figure 13:
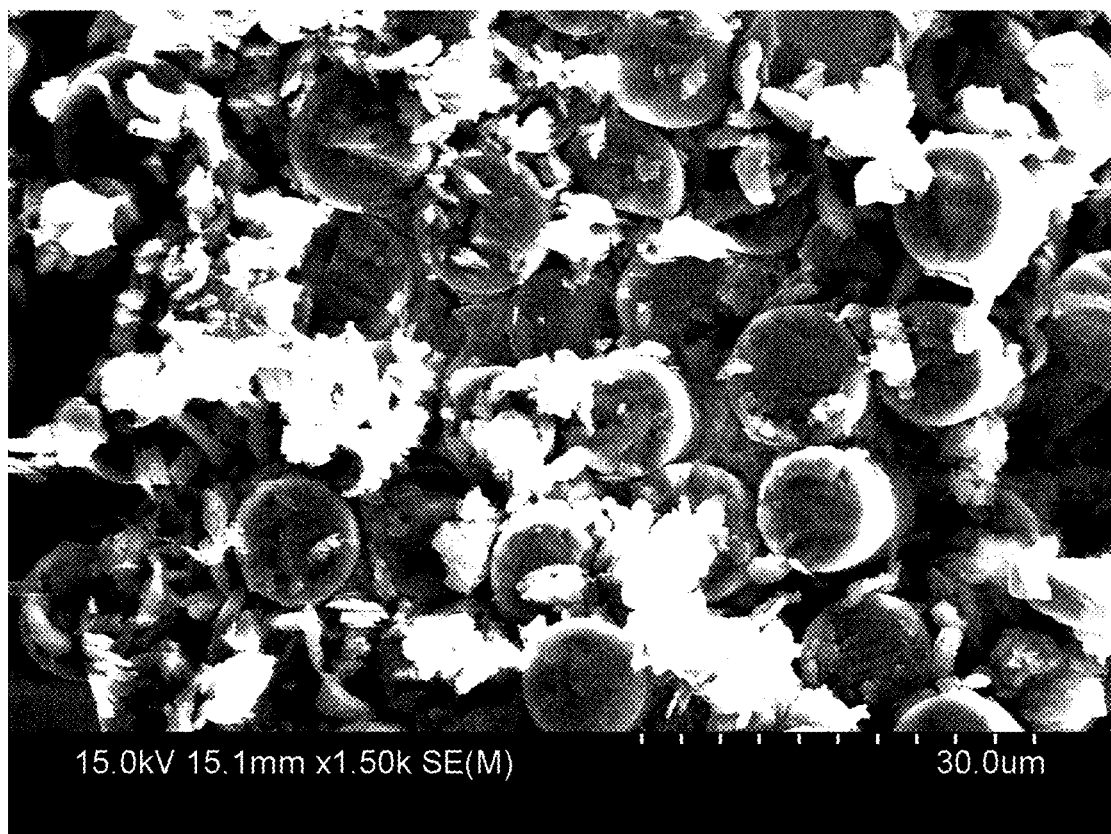
FIG. 13 is an SEM photograph magnified 1,500 times of the top insulator, which is actually manufactured according to further another embodiment of the present invention.
Figure 14:
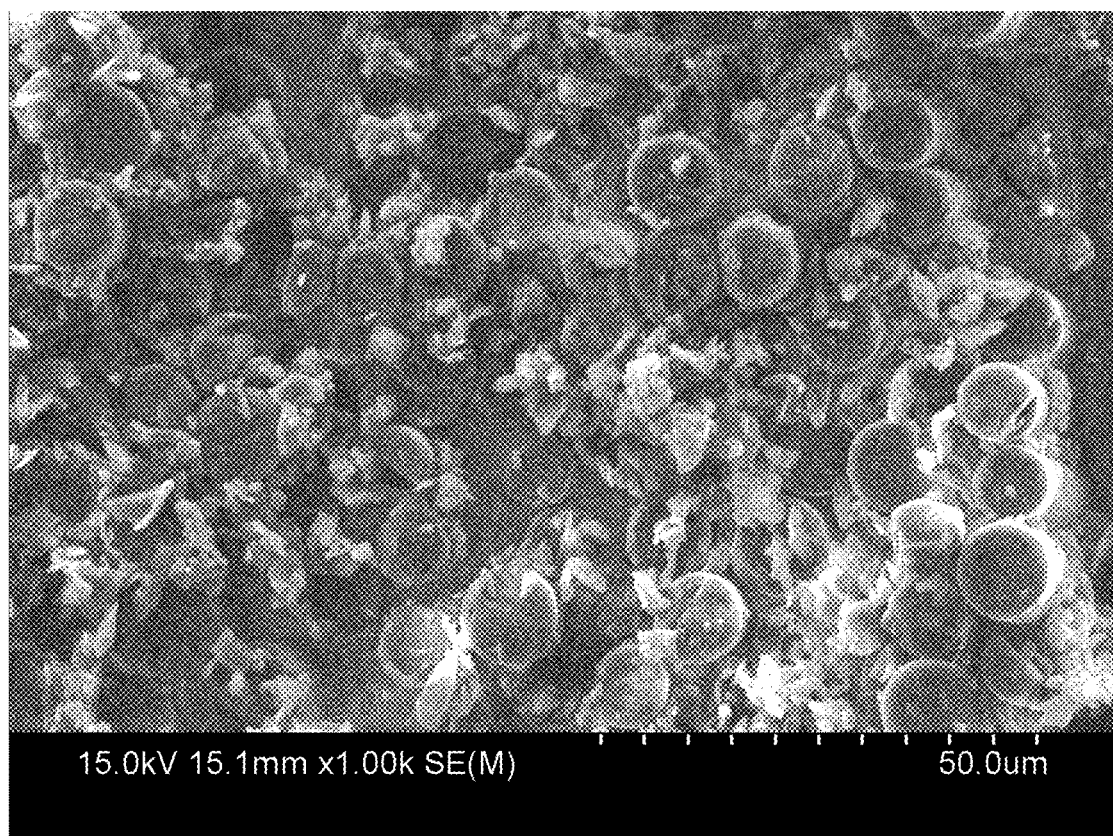
FIG. 14 is an SEM photograph magnified 1,000 times of the top insulator, which is actually manufactured according to further another embodiment of the present invention.
Figure 15:
FIG. 15 is an SEM photograph magnified 200 times of the top insulator, which is actually manufactured according to further another embodiment of the present invention.
Figure 16:
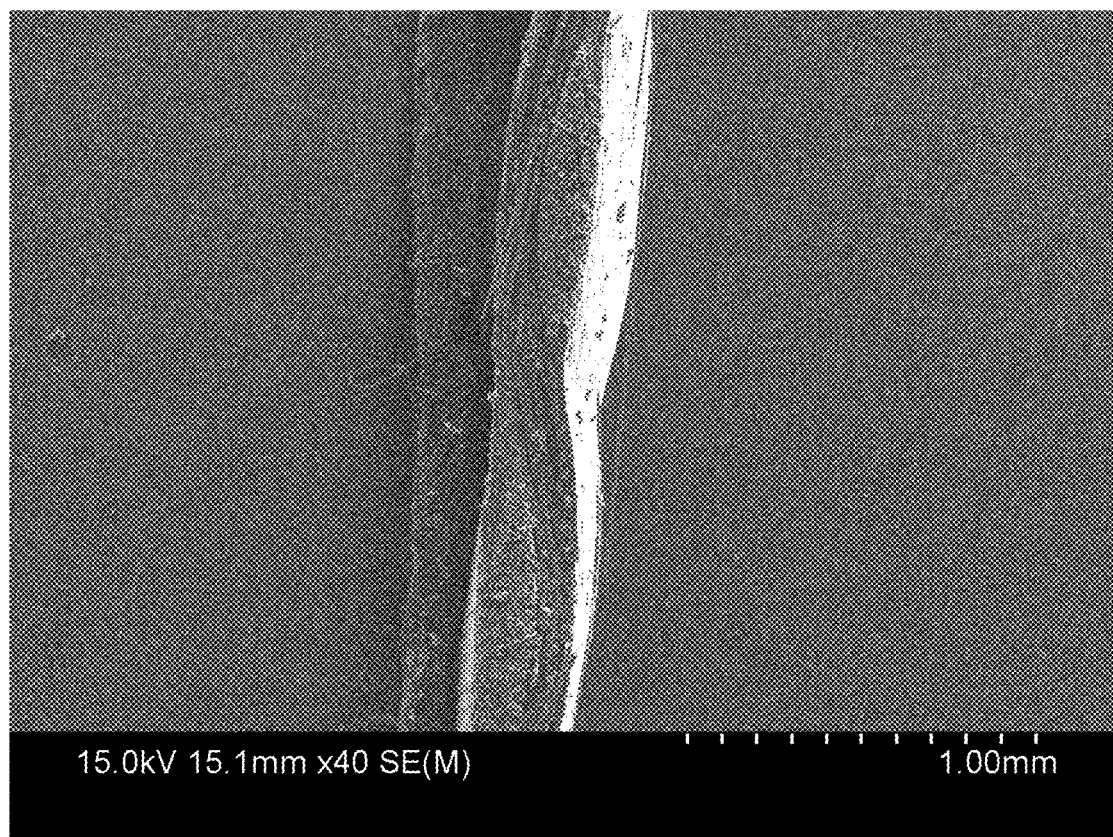
FIG. 16 is an SEM photograph magnified 40 times of the top insulator, which is actually manufactured according to further another embodiment of the present invention.

FIG. 13 is an SEM photograph magnified 1,500 times of the top insulator 16*b*, which is actually manufactured according to further another embodiment of the present invention, FIG. 14 is an SEM photograph magnified 1,000 times of the top insulator 16*b*, which is actually manufactured according to further another embodiment of the present invention, FIG. 15 is an SEM photograph magnified 200 times of the top insulator 16*b*, which is actually manufactured according to further another embodiment of the present invention, and FIG. 16 is an SEM photograph magnified 40 times of the top insulator 16*b*, which is actually manufactured according to further another embodiment of the present invention.

In FIGS. 13 and 14, the large rounded shapes are the cross-sections of the raw yarns of the glass fibers 161*b*, and the materials attached around the raw yarns of the glass fibers 161*b* are the silicone rubber 162*b*.

As illustrated in FIGS. 13 and 14, the first silicone rubber 1621*b* are closely attached to adhere between the raw yarns of the glass fiber 161*b*. Also, as illustrated in FIGS. and 16, the silicone rubber 162*b* is not formed as a separate layer.

In FIGS. 13 to 16, the pore 3 between the raw yarns of the glass fiber 161*b* and a state in which the second silicone rubber 1622*b* is inserted into the pore 3 were not photographed. However, it is determined that the second silicone rubber 1622*b* is inserted into the pore 3 when considering that the silicone rubber 162*b* does not form a separate layer even though the second silicone rubber 1622*b* is applied to the glass fiber 161*b*.

After the top insulator 16*b* according to further another embodiment of the present invention is actually manufactured, a composition ratio is measured as follows.

TABLE 1

| Material name | Composition ratio (wt %) |
| --- | --- |
| Glass Fiber (Fabric) | 70~80 |
| Siloxanes and silicones, di-Me, vinyl group-terminated | 10~15 |
| Dimethylvinylated and trimethylated silica | 0~5 |
| Aluminum trihydroxide | 10~15 |
| Titanium dioxide | 0~5 |

Table 1 shows the composition ratio of the top insulator according to Manufacturing Example.

As shown in Table 1, the glass fiber has a composition ratio of 70 wt % to 80 wt %, and the silicone rubber has a composition ratio of 20 wt % to 30 wt %. Particularly, as main chains of a silicone polymer, contents of siloxanes and silicones, di-Me, and vinyl group-terminated are 10 wt % to 15 wt %, and contents of dimethylvinylated and trimethylated silica are 0 wt % to 5 wt %. That is, the total composition ratio of the silicone polymer is 10 wt % to 20 wt %. Also, a content of aluminum trihydroxide that is a flame retardant is 10 wt % to 15 wt %, and a content of titanium dioxide that is a pigment is 0 wt % to 5 wt %. That is, since dimethylvinylated and trimethylated silica and titanium dioxide have a minimum value of 0 wt %, it does not need to be contained at all.

The top insulator for the secondary battery, which is inserted into the case of the secondary battery, according to an embodiment of the present invention includes: a glass fiber which is formed by crossing weft yarns and warp yarns of raw yarns of the glass fiber; and silicone rubber applied to at least one surface of the glass fiber.

When the top insulator for the secondary battery is heated to a temperature of 600° C. or more, or even 950° C. or more, a mass loss due to pyrolysis may be 10 wt % to 15 wt %, preferably 12 wt % to 14 wt %. Thus, the top insulator for the secondary battery according to an embodiment of the present invention is excellent in heat resistance.

Also, the top insulator for the secondary battery is impregnated into an electrolyte containing 10 wt % or more of lithium bis(fluorosulfonyl)imide (LIFSI) and stored for 1 week or more at a temperature of 72° C., a reduction amount of lithium bis(fluorosulfonyl)imide (LIFSI) may be 1 wt % to 3 wt %, preferably, 1.5 wt % to 2.5 wt %. Thus, the top insulator for the secondary battery according to an embodiment of the present invention is excellent in chemical resistance.

Also, when the secondary battery is manufactured using the top insulator for the secondary battery according to an embodiment of the present invention, pinholes may not be formed in the battery case when the secondary battery is heated at a temperature of 600° C. or more and thus exploded. Thus, the top insulator for the secondary battery according to an embodiment of the present invention is excellent in safety.

Also, when the top insulator for the secondary battery according to an embodiment of the present invention is stretched to both sides, tensile strength may be 120 N/mm$^2$ to 150 N/mm$^2$, preferably, 130 N/mm$^2$ to 140 N/mm$^2$, and elongation may be 5% to 10%, preferably, 7% to 8%. Thus, the top insulator for the secondary battery according to an embodiment of the present invention is excellent in tensile strength and elongation.

Manufacturing Example

A glass fiber fabric having a width of 1,040 mm, a length of 300,000 mm, and a thickness of 0.3 mm was prepared. Also, 12 kg of siloxanes and silicones, di-Me, and vinyl group-terminated and 4 kg of dimethylvinylated and trimethylated silica were added as main chains of a silicone polymer into 20 kg of a toluene solvent, and 13 kg of aluminum trihydroxide was added as a flame retardant. In addition, 3 kg of titanium dioxide was further added as a pigment to prepare 52 kg of a first solution.

After rollers are disposed on both sides of the glass fiber fabric, a knife was disposed on an upper end of each of the rollers. Also, the first solution was contained in a container, and the roller rotated to immerse the glass fiber fabric into the first solution. While the rollers reversely rotate to take off the glass fiber fabric, the first solution remaining on a surface of the glass fiber fabric was scraped off by the knife. Also, the glass fiber fabric was inserted into a drying furnace, and the first solution was dried at a temperature of 170° C. for 5 minutes.

Then, 12 kg of siloxanes and silicones, di-Me, and vinyl group-terminated and 4 kg of dimethylvinylated and trimethylated silica were added as the main chains of the silicone polymer into 10 kg of a toluene solvent, and 13 kg of aluminum trihydroxide was added as the flame retardant. In addition, 3 kg of titanium dioxide was further added as a pigment to prepare 41 kg of a second solution.

After rollers are disposed on both sides of the glass fiber fabric, a knife was disposed on an upper end of each of the rollers. Also, the second solution was contained in a container, and the roller rotated to immerse the glass fiber fabric into the second solution. While the rollers reversely rotate to take off the glass fiber fabric, the second solution remaining on a surface of the glass fiber fabric was scraped off by the knife. Also, the glass fiber fabric was inserted into a drying furnace, and the second solution was dried at a temperature of 170° C. for 5 minutes.

When the top insulator fabric is prepared as described above, a punching machine was inserted to punch the top insulator fabric in a disc shape having a diameter of 20 mm to prepare a top insulator according to Manufacturing Example.

Comparative Example 1

PET having a nonwoven fabric with a width of 30 mm, a length of 30 mm, and a thickness of 0.3 mm was prepared by using a PET raw material through an electrospinning method.

When the top insulator fabric is prepared as described above, a punching machine was inserted to punch the top insulator fabric in a disc shape having a diameter of 20 mm to prepare a top insulator according to Comparative Example 1.

Comparative Example 2

A glass fiber fabric having a width of 270 mm, a length of 270 mm, and a thickness of 0.3 mm was prepared. Also, 5 kg of a phenolic resin and 5 kg of aluminum trihydroxide were added to 10 kg of a toluene solvent to prepare 20 kg of a solution.

Three sheets of impregnated fabric were stacked, and heat and pressure were applied by using a hot press to prepare a cured phenolic top insulator.

When the top insulator fabric is prepared as described above, punching equipment was inserted to punch the top insulator fabric in a disc shape having a diameter of 20 mm to prepare a top insulator according to Comparative Example 2.

Method for Measuring Physical Property

1. Heat Resistance

Each of the top insulators according to foregoing Manufacturing Example, Comparative Example 1, and Comparative Example 2 was inserted into a heat resistance tester (model: TGA Q500) manufactured by TA Instruments Co., and heat was gradually applied at a temperature of 25° C. to 950° C. and a temperature increase rate of 10° C./min. Also, a mass of each top insulator was measured in real time, and an amount of mass loss due to pyrolysis was confirmed.

2. Chemical Resistance

Salts and additives were are mixed with a solvent to prepare an electrolyte. The solvent was prepared by mixing ethylene carbonate (EC), dimethyl carbonate (DMC), and ethyl methyl carbonate (EMC) with each other, and lithium hexafluorophosphate (LiFF6) and lithium bis(fluorosulfonyl)imide as the salts and various additives were mixed.

Each of the top insulators according to Manufacturing Example, Comparative Example 1, and Comparative Example 2 was impregnated into the prepared electrolyte and stored at a temperature of 72° C. for 1 week. Also, after removing the respective top insulators, the electrolyte samples were injected into NMR equipment (manufactured by Varian, model name EQC-0279) and GC-MS equipment (manufactured by SHIMADZU, model GC2010 Plus/QP2020, EQC-0291) to perform NMR and GC analysis, thereby analyzing a composition ratio and reaction byproducts of respective electrolyte samples.

3. Flame Propagation

In this test, the top insulators according to Comparative Examples 1 and 2 were not tested, and only the top insulator according to Manufacturing Example was tested. Thus, it was confirmed that the top insulator according to Manufacturing Example satisfies a flame propagation performance standard. The test standard depends on IMO RESOLUTION MSC.307 (88).

Particularly, the top insulator according to Manufacturing Example was installed in equipment having a main heat source and an auxiliary heat source, and flame was applied. Flame as the main heat source is generated by using a methane gas having a purity of 99.99% as a fuel in a radiation plate having a width of 483 mm and a length of 284 mm. Here, an amount of heat is 50.5 kW/m$^2$ at a point of 50 mm and 23.9 kW/m$^2$ at a point of 350 mm. Also, pilot flame as the auxiliary heat source has a length of about 230 mm, and the flame is generated by using a propane gas as a fuel.

First, in order to standardize the operating conditions of the equipment, a calibration test piece was installed, the radiation plate and the pilot flame were ignited, and it was confirmed that a chimney signal value is continuously stabilized for at least 180 seconds. When the signal value became stable, the calibration test piece was removed, and the top insulator according to Manufacturing Example was installed within 10 seconds. Also, the chimney signal value was continuously measured, and each of a time at which a flame tip reaches a point of 50 mm of the top insulator according to Manufacturing Example and a point at which the flame is extinguished and a time at which the flame is extinguished was recorded.

If no ignition occurs for 600 seconds after the start of the test, or 180 seconds elapses after the flame has extinguished, the top insulator according to Manufacturing Example was removed, and a standard test piece was installed again. The total three top insulators according to Manufacturing Example were manufactured, and this process was repeated three times in total.

4. Stability

The secondary batteries were manufactured by using the top insulators according to Manufacturing Example, Comparative Example 1, and Comparative Example 2 and then fully charged. Also, when the secondary batteries are put in the heating furnace maintained at a temperature of 600° C. and heated for 3 minutes to 5 minutes, the secondary batteries are exploded. Also, the exploded secondary batteries were cooled at room temperature, and then the cap assembly was disassembled to confirm whether pinholes occur at the upper edge of the battery can.

5. Tensile Strength and Elongation

Each of the top insulators manufactured according to Manufacturing Example, Comparative Example 1, and Comparative Example 2 was fixed to upper and lower jigs of an universal testing machine (UTM, Model 3340) manufactured by Instron. Also, required force was measured while being stretched at a speed of 300 mm/min, and this force was evaluated as the tensile strength. Also, a ratio of the stretched length by the tensile strength was evaluated as the elongation. The test was performed twice, and an average value of respective results was calculated.

Physical Property Measurement Result
1. Heat Resistance

TABLE 2

| Temperature range | 0~320° C. | 320~600° C. | 600~700° C. | Residue |
|---|---|---|---|---|
| Manufacturing Example | 3.8 wt % | 9.3 wt % | 0.3 wt % | 86.6 wt % |
| Comparative Example 1 | — | 100 wt % | — | 0 wt % |
| Comparative Example 2 | 40.5 wt % | — | — | 59.5 wt % |

Figure 17:
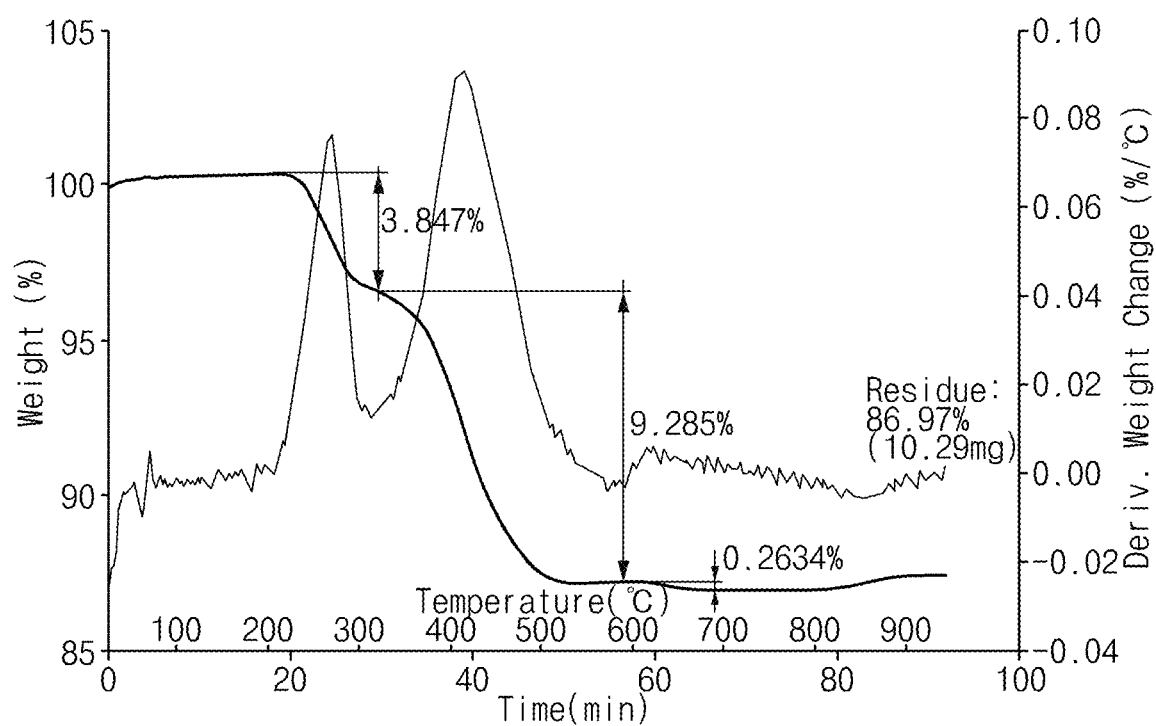
FIG. 17 is a graph illustrating results obtained through a heat resistance test of the top insulator according to Manufacturing Example of the present invention.
Figure 18:
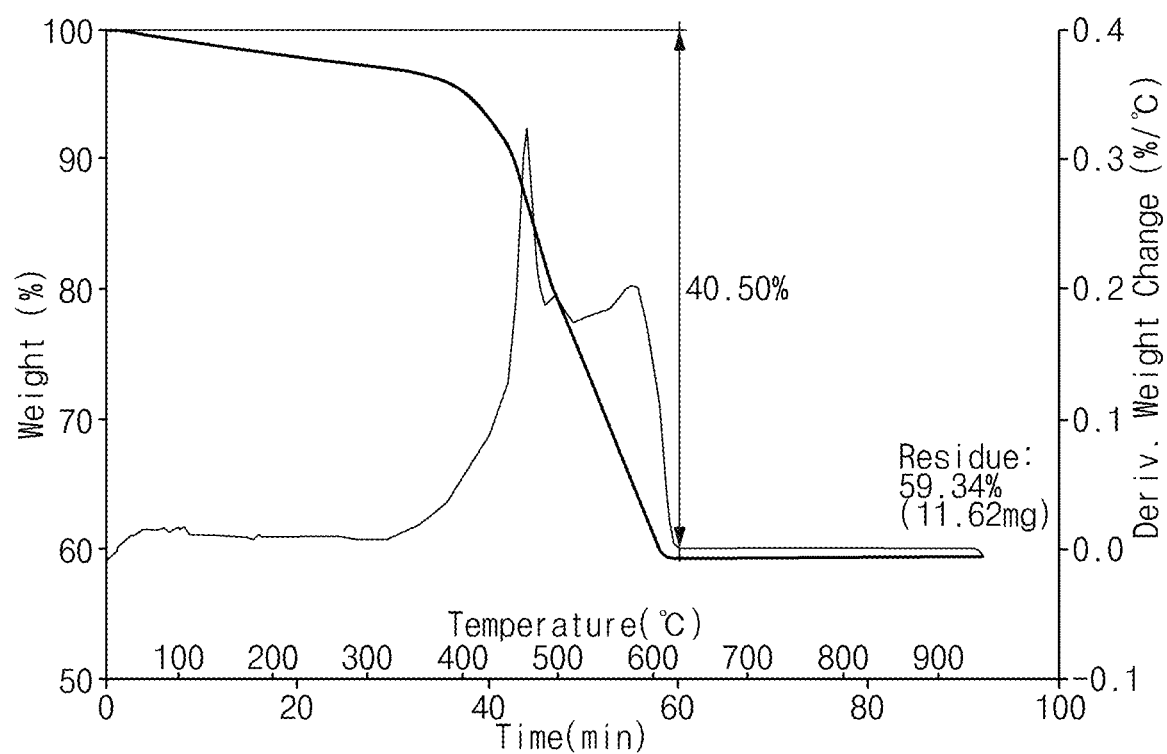
FIG. 18 is a graph illustrating results obtained through a heat resistance test of the top insulator according to Comparative Example 2.

FIG. 17 is a graph illustrating results obtained through the heat resistance test of the top insulator according to Manufacturing Example of the present invention, and FIG. 18 is a graph illustrating results obtained through the heat resistance test of the top insulator according to Comparative Example 2. Also, Table 2 shows an amount of mass loss and a residual mass of each top insulator according to a temperature range.

As illustrated in FIG. 17, the top insulator according to Manufacturing Example decreased gradually in stages. Also, the reduced mass width is shown in Table 2 above. As shown in Table 2, it was confirmed that the top insulator according to Manufacturing Example has a mass loss of 3.8 wt % in the range of 0° C. to 320° C., a mass loss of 9.3 wt % in the range of 320° C. to 600° C., and a mass loss of 0.3 wt % in the range of 600° C. to 700° C.

On the other hand, as illustrated in FIG. 18, a mass of the top insulator according to Comparative Example 2 continuously decreased up to a temperature of 600° C., and a mass of the top insulator rapidly decreased in the range of 320° C. to 600° C. As shown in Table 2, it was confirmed that the top insulator according to Comparative Example 2 has a mass loss of 40.5 wt % in the range of 0° C. to 600° C.

When the top insulator according to Comparative Example 1 has a temperature of 600° C., it was completely burned and lost a mass of 100 wt %, and it was not shown in the graph because it burned quickly.

Thus, it was confirmed that the top insulator according to Manufacturing Example has the least amount of mass loss of 13.4 wt % due to the pyrolysis at a temperature of 600° C. or more, and even has heat stability up to a temperature of 950° C.

2. Chemical Resistance

TABLE 3

|  | LiPF6 | LiFSI | Remaining component |
|---|---|---|---|
| Ref. | 9.5 | 11.4 | 79.1 |
| Manufacturing Example | 6.5 | 9.3 | 84.2 |
| Comparative Example 1 | 9.4 | 11.1 | 79.5 |
| Comparative Example 2 | 7.8 | 0.8 | 91.4 |

Figure 19:
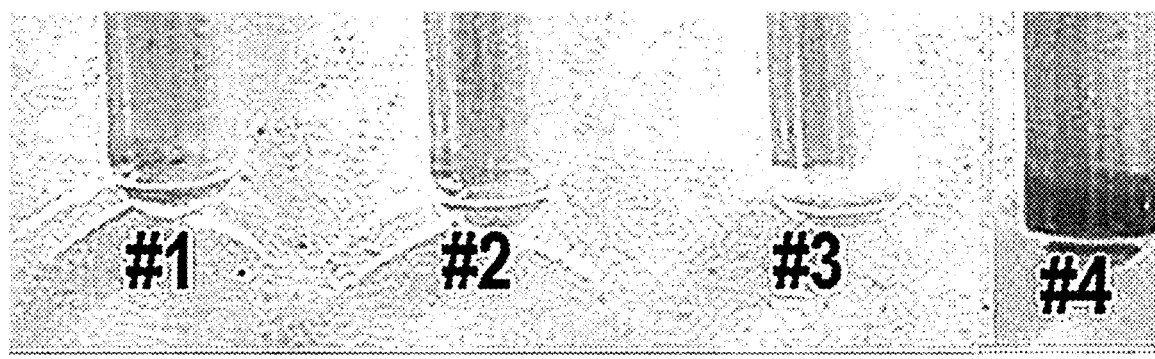
FIG. 19 is a photograph illustrating a state of each of electrolyte samples after a chemical resistance test.
Figure 20:
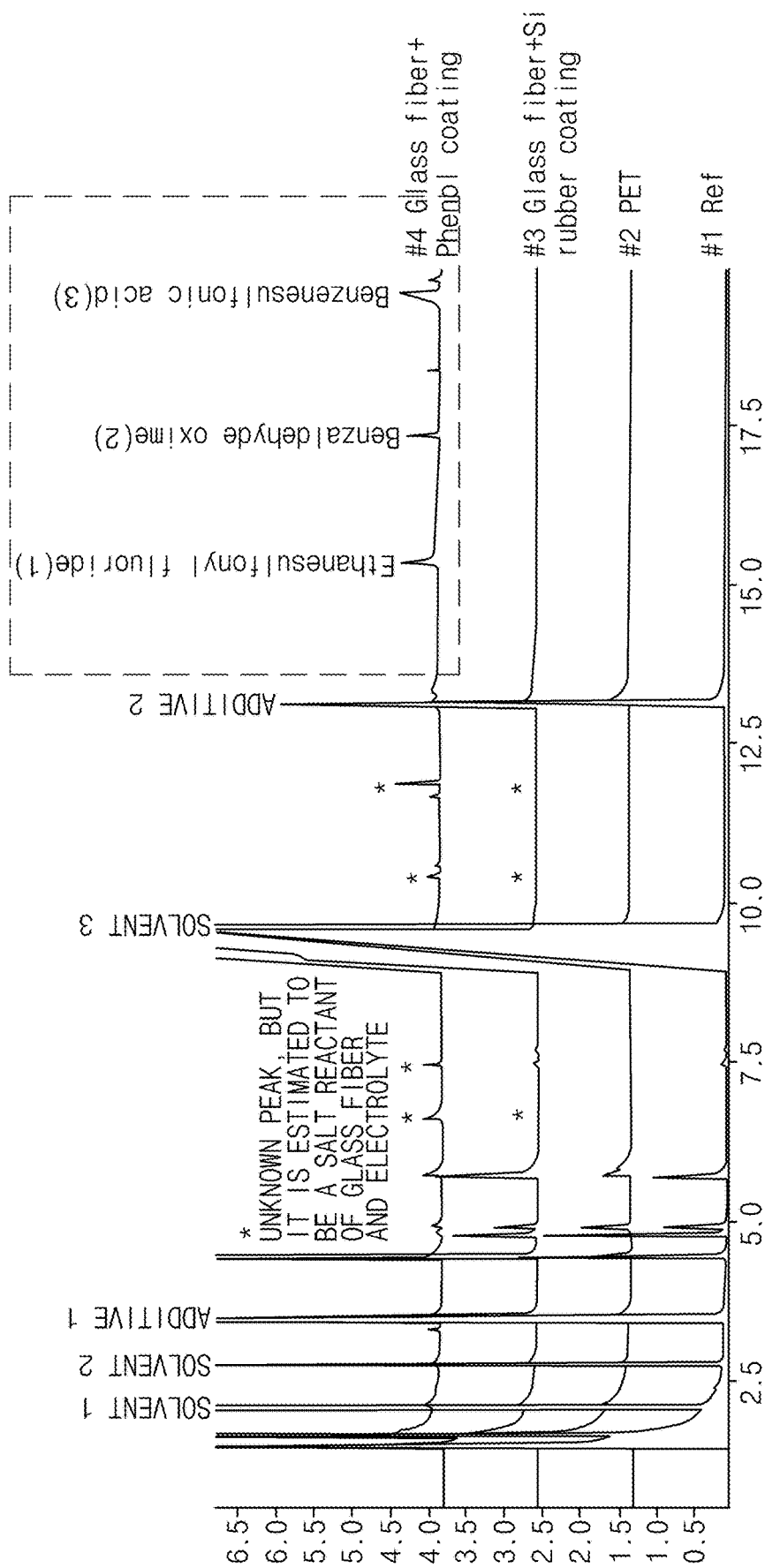
FIG. 20 is a graph illustrating results of a GC-MS test on each of the electrolyte samples.

FIG. 19 is a photograph illustrating a state of each of the electrolyte samples after the chemical resistance test, and FIG. 20 is a graph illustrating results of a GC-MS test on each of the electrolyte samples. Also, Table 3 shows a composition ratio of the components of each electrolyte sample.

As shown in Table 3, LiPF6 and LiFSI relatively decrease in all the samples, and the remaining components tend to relatively increase. However, this does not mean that LiPF6 and LiFSI are decomposed and changed into the remaining components of the electrolyte because the absolute mass is not changed. Since the numerical values shown in Table 3 are relative mass ratios, it means that LiPF6 and LiFSI are relatively more decomposed.

As shown in Table 3, in the top insulator according to Manufacturing Example of the present invention, LiPF6 was reduced by 3 wt %, and LiFSI was reduced by 2.1 wt % when compared to the Ref. electrolyte. However, in the top insulator according to Comparative Example 1, LiPF6 and LiFSI were reduced by 0.1 wt % and 0.3 wt %, respectively, and in the top insulator according to Comparative Example 2, LiPF6 was reduced by 1.7 wt %, and LiFSI was reduced by 10.6 wt %. That is, it is seen that LiFSI is the most reduced in the top insulator according to Comparative Example 2, which indicates that the top insulator according to Comparative Example 2 is the most active.

Referring to the photograph of FIG. 19, it is visually confirmed that a color of the electrolyte contained in the top insulator according to Comparative Example 2 is most changed. Also, in the graph of FIG. 20, it is confirmed that the top insulator according to Comparative Example 2 has the weakest chemical resistance because a large number of byproducts, which are not initially present in the electrolyte containing the top insulator according to Comparative Example 2, are detected.

Thus, it was confirmed that the top insulator according to Manufacturing Example is more excellent in chemical resistance than the top insulator according to Comparative Example 2.

However, the top insulator according to Comparative Example 1 had the highest chemical resistance. However, in the heat resistance test, it was confirmed that the top insulator according to Comparative Example 1 has the lowest heat resistance, and thus, the top insulator according to Manufacturing Example is excellent in heat resistance and chemical resistance.

3. Flame Propagation

TABLE 4

| Specimen number | Manufacturing Example 1 | Manufacturing Example 2 | Manufacturing Example 3 | Average | Reference |
|---|---|---|---|---|---|
| Average combustion sustained heat (MJ/m$^2$) | — | — | — | — | ≥1.5 |
| Critical flux when extinguished (kW/m$^2$) | 48.7 | 49.1 | 47.9 | 48.6 | ≥20.0 |

TABLE 4-continued

| Specimen number | Manufacturing Example 1 | Manufacturing Example 2 | Manufacturing Example 3 | Average | Reference |
|---|---|---|---|---|---|
| Total heat emission (MJ) | 0.01 | 0.06 | 0.02 | 0.03 | ≤0.7 |
| Maximum heat release rate (kW) | 0.01 | 0.33 | 0.29 | 0.21 | ≤4.0 |
| Flame drop | None | None | None | None | None |

TABLE 5

| | Specimen number ||||||
|---|---|---|---|---|---|---|
| | Manufacturing Example 1 || Manufacturing Example 2 || Manufacturing Example 3 ||
| Measurement item | Elapse time (Minute:Second) | Average combustion sustained heat (MJ/m$^2$) | Elapse time (Minute:Second) | Average combustion sustained heat (MJ/m$^2$) | Elapse time (Minute:Second) | Average combustion sustained heat (MJ/m$^2$) |
| Flame reaching distance (mm) 50 | 00:16 | 0.81 | 00:14 | 0.71 | 00:15 | 0.76 |
| 100 | 00:28 | 1.39 | 00:20 | 0.99 | 00:21 | 1.04 |
| 150 | — | — | — | — | — | — |
| Ignition time (Minute:Second) | 00:13 || 00:12 || 00:13 ||
| Extinguishment time (Minute:Second) | 00:54 || 00:31 || 00:50 ||
| Test time (Minute:Second) | 10:00 || 10:00 || 10:00 ||

Table 4 shows results of the critical flux at extinguishment, the total heat emission, the maximum heat release rate, and whether flame drops with respect to the top insulator according to Manufacturing Example, and Table 5 shows results of the average combustion sustained heat with respect to the top insulator according to Manufacturing Example.

The combustion sustained heat is a value obtained by multiplying a time from first exposure of the specimen to a time at which a flame tip reaches each point by a radiant heat flux irradiated to correspond to the incombustible calibration plate at the same point. Also, the average combustion sustained heat is an average value of the characteristic values measured at different locations by the combustion sustained heat. As shown in Table 5, the average combustion sustained heat of the top insulator according to Manufacturing Example was less than 1.5 that is reference value when the flame reaching distance is 50 mm or 100 mm.

However, in the top insulators according to Manufacturing Examples 1 to 3, the ignition started at 13 seconds, 12 seconds, and 13 seconds, respectively. However, the flame was respectively extinguished at 54 seconds, 31 seconds, and 50 seconds, and then the top insulators were no longer ignited. Thus, it was confirmed that the flame is not sustained in the top insulator because the flame is extinguished at a short time even though the average combustion sustained heat is low during the combustion. That is, it was confirmed that the flame is not easily propagated to the surroundings thereof to secure safety.

Critical flux at extinguishment means a flow rate of heat at a position where the flame is propagated farthest from a central line of the burning specimen so as to be stopped. The recorded heat flux is obtained through the calibration test of the test machine by using the calibration plate. As shown in Table 4, the average value of the critical flux at the extinguishment of the top insulator according to Manufacturing Example is 48.6 kW/m$^2$, which is larger than the reference value of 20.0 kW/m$^2$ and thus satisfies the criterion.

The total heat emission means the total heat emission during the test period, and the maximum heat release rate means the maximum heat release rate during the test period. As shown in Table 4, the average value of the total heat emission of the top insulator according to Manufacturing Example is 0.03 MJ, which is less than 0.7 MJ that is a reference value, and the average value of the maximum heat release rate is 0.21 kW, which is less than 4.0 kW that is a reference value.

4. Stability

TABLE 6

| | Total Number | Number of pinhole occurrence | Rate of pinhole occurrence |
|---|---|---|---|
| Manufacturing Example | 41 | 0 | 0% |
| Comparative Example 1 | 15 | 3 | 20% |
| Comparative Example 2 | 15 | 0 | 0% |

Figure 21:
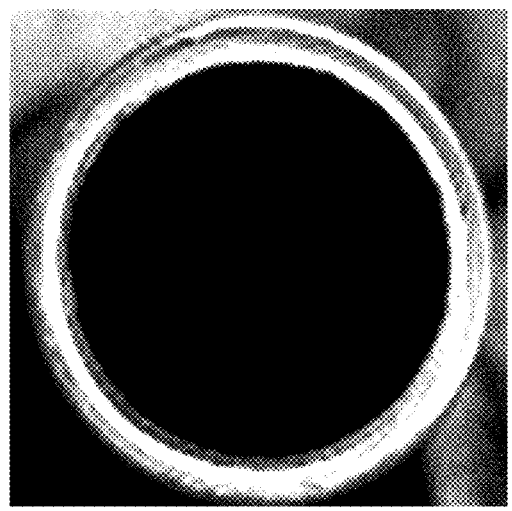
FIG. 21 is a photograph illustrating a disassembled state of a secondary battery with which a top insulator is assembled according to Manufacturing Example of the present invention after a stability test.
Figure 22:
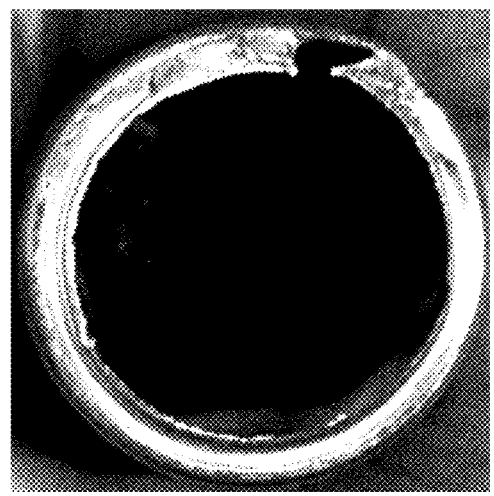
FIG. 22 is a photograph illustrating a disassembled state of a secondary battery with which a top insulator is assembled according to Comparative Example 1 after the stability test.
Figure 23:
FIG. 23 is a photograph illustrating a disassembled state of a secondary battery with which a top insulator is assembled according to Comparative Example 2 after the stability test.

FIG. 21 is a photograph illustrating a disassembled state of the secondary battery with which the top insulator is assembled according to Manufacturing Example of the present invention after the stability test, FIG. 22 is a photograph illustrating a disassembled state of the secondary battery with which the top insulator is assembled according to Comparative Example 1 after the stability test, and FIG. 23 is a photograph illustrating a disassembled state of the secondary battery with which the top insulator is assembled according to Comparative Example 2 after the stability test. Also, Table 6 shows the number of pin hole occurrences and a ratio of the respective top insulators.

As illustrated in FIG. 22, the pinholes were generated in the secondary battery in which the top insulator according to Comparative Example 1 is assembled. Particularly, as show in Table 6, among the fifteen secondary batteries assembled with the top insulator according to Comparative Example 1, pinholes were generated in three secondary batteries.

On the other hand, as illustrated in FIGS. 21 and 23, it was confirmed that the top insulator according to Manufacturing Example and the top insulator according to Comparative Example 2 did not generate the pinholes at all and had the best stability against the explosion of the battery.

However, since the top insulator according to Comparative Example 2 is vulnerable in heat resistant, chemical resistance, and stability rather than the top insulator according to Manufacturing Example, it was confirmed that the top insulator according to Manufacturing Example is excellent in all heat resistance, chemical resistance and stability.

5. Tensile Strength and Elongation

TABLE 7

| | Tensile strength (N/mm$^2$) | | | Elongation (%) | | |
|---|---|---|---|---|---|---|
| | 1 | 2 | Average | 1 | 2 | Average |
| Manufacturing Example | 130.12 | 137.16 | 133.64 | 6.89 | 7.37 | 7.13 |
| Comparative Example 1 | 60.3 | 53.4 | 56.9 | 47.0 | 51.0 | 49.0 |
| Comparative Example 2 | — | — | — | 0 | 0 | 0 |

Table 7 shows the tensile strength and elongation of the respective top insulator.

As shown in Table 7, the top insulator according to Manufacturing Example was broken at an average tensile strength of 133.64 N/mm$^2$. Also, an average value of the elongation at this time was 7.13%.

However, the top insulator according to Comparative Example 1 was broken at an average tensile strength of 56.9 N/mm$^2$. Also, an average value of the elongation at this time was 49.0%.

Also, the top insulator according to Comparative Example 2 was not stretched at all up to 1000N which is a maximum allowable weight of the universal testing machine. Thus, the tensile strength was not measured, and an average value of the elongation was 0%.

Thus, the top insulator according to Comparative Example 1 has a problem of being easily deformed by small force because of low tensile strength and high elongation. Also, since the top insulator according to Comparative Example 2 does not have a stretching property, it may not be manufactured into a roll type. Thus, since the top insulator is not put into a line, continuous production may be impossible, and a production rate may be lowered. However, the top insulator according to Manufacturing Example may be manufactured into the roll type in which the top insulator is rolled up to one side because of its high tensile strength and low elongation, and the ability to be stretched to some extent.

As described above, when the glass fiber 161 is coated with the silicone rubber 162, the properties such as the heat resistance and the chemical resistance may be improved by manufacturing the top insulator 16 for the secondary battery as compared to the case of coating with a thermoplastic resin or phenol according to the related art. Particularly, the phenol has a chain bonding form in which a central element is carbon (C), but the silicone polymer as a main raw material of the silicone rubber 162 has a chain bonding form in which the central element is silicone. Accordingly, high thermal stability may be obtained. In addition, when the top insulator 16 for the secondary battery is punched, the generation of the dust may be suppressed to enable the products to be continuously produced, increase in production amount, and decrease in manufacturing cost. Furthermore, before the top insulator 16 for the secondary battery is punched, the top insulator fabric may have the flexibility and be easily rolled to easily form a mother roll, and thus, the top insulator 16 for the secondary battery may be easily manufactured.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A method for manufacturing a top insulator configured to be inserted into a case of a secondary battery, the method comprising:
    preparing a top insulator fabric by applying a silicone rubber to at least one surface of a glass fiber fabric formed by crossing weft yarns and warp yarns of glass fiber raw yarns; and
    punching the top insulator fabric,
    wherein the preparing the top insulator fabric comprises applying a first silicone rubber and applying a second silicone rubber,
    wherein the applying the first silicone rubber comprises:
        applying a first solution, in which a first silicone polymer is dissolved, to the at least one surface; and
        drying the applied first solution to apply the first silicone rubber,
    wherein, after the applying the first silicone rubber, the applying the second silicone rubber comprises:
        applying a second solution, in which a second silicone polymer is dissolved, to the at least one surface; and
        drying the applied second solution to apply the second silicone rubber, wherein the first solution has a viscosity less than that of the second solution,
    wherein the applying the first silicone rubber is performed so that the first silicone rubber is attached to the glass fiber raw yarns, and a pore is formed between the glass fiber raw yarns having the first silicone rubber attached thereto, and
    wherein, in applying the second silicone rubber, the second silicone rubber is inserted into the pore to fill the pore.

2. The method of claim 1, wherein the pore is a pore formed between the glass fiber raw yarns that are perpendicular to each other.

3. The method of claim 1, wherein, after the applying the second silicone rubber, the first silicone rubber and the second silicone rubber are stacked on the at least one surface of the glass fiber fabric.

4. The method of claim 1, wherein, after the applying the first silicone rubber, the first silicone rubber is stacked on the at least one surface of the glass fiber fabric.

5. The method of claim 1, wherein, after the preparing the top insulator fabric, the glass fiber fabric and the top insulator fabric have a same thickness.

6. The method of claim 1, wherein, in the punching the glass fiber, the glass fiber is punched to have a disc shape.

7. The method of claim 1, wherein, in the preparing the top insulator fabric, the silicone rubber is applied to all surfaces of the glass fiber fabric.

8. The method of claim 1, wherein the applying the first silicone rubber further comprises, scraping off the first solution remaining on the surface of the glass fiber fabric with a knife after applying the first solution but before drying the applied first solution, and wherein the applying the second silicone rubber further comprises scraping off the second solution remaining on the surface of the glass fiber fabric with a knife after applying the second solution but before drying the applied second solution.

9. The method of claim 1, wherein, after drying the applied first solution, the second solution is applied to the first silicone rubber to apply the second silicone rubber such that the second silicone rubber is laminated on the first silicone rubber.

\* \* \* \* \*